United States Patent
Zhu et al.

(10) Patent No.: US 9,408,269 B2
(45) Date of Patent: Aug. 2, 2016

(54) SYSTEMS AND METHODS FOR DIMMING CONTROL USING TRIAC DIMMERS

(71) Applicant: ON-BRIGHT ELECTRONICS (SHANGHAI) CO., LTD., Shanghai (CN)

(72) Inventors: Liqiang Zhu, Shanghai (CN); Jun Zhou, Shanghai (CN); Yongsheng Su, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 64 days.

(21) Appl. No.: 13/710,277

(22) Filed: Dec. 10, 2012

(65) Prior Publication Data
US 2014/0132172 A1    May 15, 2014

(30) Foreign Application Priority Data

Nov. 12, 2012  (CN) .......................... 2012 1 0468505

(51) Int. Cl.
*H05B 37/02*  (2006.01)
*H05B 33/08*  (2006.01)

(52) U.S. Cl.
CPC ........ *H05B 33/0845* (2013.01); *H05B 33/0815* (2013.01); *H05B 37/02* (2013.01)

(58) Field of Classification Search
None
See application file for complete search history.

(56) References Cited

U.S. PATENT DOCUMENTS

| | | | | |
|---|---|---|---|---|
| 3,803,452 A | * | 4/1974 | Goldschmied | H05B 37/02 315/200 A |
| 4,253,045 A | * | 2/1981 | Weber | H05B 37/029 315/209 R |
| 5,144,205 A | * | 9/1992 | Motto et al. | H05B 41/382 315/174 |
| 5,949,197 A | * | 9/1999 | Kastner | H05B 41/2851 315/291 |
| 6,218,788 B1 | * | 4/2001 | Chen et al. | 315/225 |
| 6,229,271 B1 | | 5/2001 | Liu | |
| 7,038,399 B2 | * | 5/2006 | Lys et al. | F21K 9/135 315/291 |
| 7,649,327 B2 | | 1/2010 | Peng | |

(Continued)

FOREIGN PATENT DOCUMENTS

CN    1448005 A    10/2003
CN  101657057 A     2/2010

(Continued)

OTHER PUBLICATIONS

Taiwan Intellectual Property Office, Office Action mailed Jan. 7, 2014, in Application No. 100119272.

(Continued)

*Primary Examiner* — Douglas W Owens
*Assistant Examiner* — Srinivas Sathiraju
(74) *Attorney, Agent, or Firm* — Jones Day

(57) ABSTRACT

System and method for dimming control of one or more light emitting diodes. An example system includes one or more signal processing components configured to receive a first signal associated with a TRIAC dimmer, process information associated with the first signal, determine whether the TRIAC dimmer is in a first condition or a second condition, generate a second signal based on at least information associated with the first signal, and send the second signal to a switch. The one or more signal processing components are further configured to, if the TRIAC dimmer is determined to be in the first condition, generate the second signal to cause the switch to be opened and closed corresponding to a modulation frequency.

17 Claims, 15 Drawing Sheets

(56) References Cited

U.S. PATENT DOCUMENTS

| | | | |
|---|---|---|---|
| 7,880,400 B2* | 2/2011 | Zhou et al. | 315/247 |
| 7,944,153 B2 | 5/2011 | Greenfeld | |
| 8,134,302 B2 | 3/2012 | Yang et al. | |
| 8,278,832 B2* | 10/2012 | Hung et al. | H05B 33/0815 315/219 |
| 8,378,583 B2* | 2/2013 | Hying et al. | H05B 33/0851 315/287 |
| 8,378,588 B2* | 2/2013 | Kuo et al. | H05B 33/0818 315/209 R |
| 8,378,589 B2* | 2/2013 | Kuo et al. | H05B 33/0815 315/209 R |
| 8,432,438 B2* | 4/2013 | Ryan et al. | 348/61 |
| 8,497,637 B2* | 7/2013 | Liu | H05B 33/0815 315/172 |
| 8,644,041 B2* | 2/2014 | Pansier | H02M 1/4225 323/299 |
| 8,698,419 B2* | 4/2014 | Yan | H05B 33/0815 315/294 |
| 8,890,440 B2* | 11/2014 | Yan | H05B 37/02 315/209 R |
| 8,941,324 B2* | 1/2015 | Zhou | H05B 33/0815 315/247 |
| 9,030,122 B2* | 5/2015 | Yan | H05B 33/0818 315/291 |
| 9,220,136 B2 | 12/2015 | Zhang | |
| 2006/0022648 A1 | 2/2006 | Ben-Yaakov et al. | |
| 2007/0182699 A1 | 8/2007 | Ha et al. | |
| 2007/0267978 A1 | 11/2007 | Shteynberg et al. | |
| 2008/0224629 A1 | 9/2008 | Melanson | |
| 2008/0278092 A1 | 11/2008 | Lys et al. | |
| 2009/0021469 A1 | 1/2009 | Yeo et al. | |
| 2009/0251059 A1* | 10/2009 | Veltman | 315/200 R |
| 2010/0164406 A1* | 7/2010 | Kost et al. | 315/307 |
| 2010/0176733 A1* | 7/2010 | King | H05B 37/0245 315/158 |
| 2010/0207536 A1 | 8/2010 | Burdalski | |
| 2010/0213859 A1 | 8/2010 | Shteynberg | |
| 2011/0037399 A1 | 2/2011 | Hung et al. | |
| 2011/0080110 A1 | 4/2011 | Nuhfer et al. | |
| 2011/0080111 A1* | 4/2011 | Nuhfer et al. | 315/291 |
| 2011/0121744 A1 | 5/2011 | Salvestrini | |
| 2011/0121754 A1 | 5/2011 | Shteynberg | |
| 2011/0227490 A1* | 9/2011 | Huynh | 315/185 R |
| 2011/0260619 A1 | 10/2011 | Sadwick | |
| 2011/0285301 A1 | 11/2011 | Kuang et al. | |
| 2011/0291583 A1 | 12/2011 | Shen | |
| 2011/0309759 A1 | 12/2011 | Shteynberg | |
| 2012/0146526 A1 | 6/2012 | Lam et al. | |
| 2012/0181946 A1 | 7/2012 | Melanson | |
| 2012/0268031 A1* | 10/2012 | Zhou et al. | 315/291 |
| 2012/0299500 A1 | 11/2012 | Sadwick | |
| 2012/0299501 A1 | 11/2012 | Kost et al. | |
| 2012/0326616 A1 | 12/2012 | Sumitani et al. | |
| 2013/0009561 A1* | 1/2013 | Briggs | H05B 33/0851 315/210 |
| 2013/0020965 A1 | 1/2013 | Kang et al. | |
| 2013/0026942 A1* | 1/2013 | Ryan et al. | 315/224 |
| 2013/0026945 A1* | 1/2013 | Ganick et al. | 315/246 |
| 2013/0027528 A1* | 1/2013 | Staats et al. | 348/61 |
| 2013/0063047 A1 | 3/2013 | Veskovic | |
| 2013/0175931 A1* | 7/2013 | Sadwick | H05B 37/0245 315/158 |
| 2013/0181630 A1* | 7/2013 | Taipale | H05B 37/0263 315/224 |
| 2013/0193879 A1 | 8/2013 | Sadwick | |
| 2013/0215655 A1 | 8/2013 | Yang et al. | |
| 2013/0223107 A1* | 8/2013 | Zhang | H02M 3/33523 363/21.16 |
| 2013/0241427 A1* | 9/2013 | Kesterson | H05B 37/02 315/210 |
| 2013/0241428 A1* | 9/2013 | Takeda | H05B 33/0827 315/210 |
| 2013/0242622 A1 | 9/2013 | Peng | |
| 2013/0307431 A1* | 11/2013 | Zhu | H05B 33/0815 315/210 |
| 2013/0307434 A1 | 11/2013 | Zhang | |
| 2014/0029315 A1* | 1/2014 | Zhang | H02M 3/33507 363/21.13 |
| 2014/0063857 A1 | 3/2014 | Peng | |
| 2014/0078790 A1* | 3/2014 | Lin | H02M 3/33507 363/21.16 |
| 2014/0103829 A1 | 4/2014 | Kang | |
| 2014/0132172 A1* | 5/2014 | Zhu | H05B 37/02 315/210 |
| 2014/0160809 A1* | 6/2014 | Lin | H02M 3/33523 363/21.16 |
| 2014/0265935 A1 | 9/2014 | Sadwick | |
| 2014/0346973 A1* | 11/2014 | Zhu | H05B 37/02 315/307 |
| 2014/0354170 A1 | 12/2014 | Gredler | |
| 2015/0077009 A1 | 3/2015 | Kunimatsu | |
| 2015/0091470 A1 | 4/2015 | Zhou et al. | |
| 2015/0312988 A1 | 10/2015 | Liao et al. | |
| 2016/0014861 A1 | 1/2016 | Zhu et al. | |
| 2016/0014865 A1 | 1/2016 | Zhu et al. | |

FOREIGN PATENT DOCUMENTS

| | | |
|---|---|---|
| CN | 101868090 | 10/2010 |
| CN | 101896022 A | 11/2010 |
| CN | 101917804 A | 12/2010 |
| CN | 101998734 A | 3/2011 |
| CN | 102014551 A | 4/2011 |
| CN | 102056378 A | 5/2011 |
| CN | 102209412 A | 10/2011 |
| CN | 102300375 A | 12/2011 |
| CN | 102347607 | 2/2012 |
| CN | 102387634 A | 3/2012 |
| CN | 103004290 | 3/2012 |
| CN | 102474953 | 5/2012 |
| CN | 102497706 | 6/2012 |
| CN | 202353859 U | 7/2012 |
| CN | 102695330 A | 9/2012 |
| CN | 102791056 A | 11/2012 |
| CN | 102843836 A | 12/2012 |
| CN | 202632722 U | 12/2012 |
| CN | 102870497 | 1/2013 |
| CN | 102946674 A | 2/2013 |
| CN | 103024994 A | 4/2013 |
| CN | 103313472 | 9/2013 |
| CN | 103369802 A | 10/2013 |
| CN | 103379712 A | 10/2013 |
| CN | 103547014 | 1/2014 |
| CN | 103716934 | 4/2014 |
| CN | 103858524 | 6/2014 |
| EP | 2403318 | 1/2012 |
| JP | 2008-010152 A | 1/2008 |
| JP | 2011-249328 A | 12/2011 |
| TW | 201215228 A1 | 9/2010 |
| TW | 201125441 A | 7/2011 |
| TW | 201132241 | 9/2011 |
| TW | 201143530 A | 12/2011 |
| TW | 201146087 A1 | 12/2011 |
| TW | 201208463 A1 | 2/2012 |
| TW | 201208481 A1 | 2/2012 |
| TW | 201208486 | 2/2012 |
| TW | I387396 | 2/2013 |
| TW | 201322825 A | 6/2013 |
| TW | 201342987 | 10/2013 |
| TW | I423732 | 1/2014 |
| TW | 201412189 A | 3/2014 |
| TW | M477115 | 4/2014 |
| TW | 201417626 A | 5/2014 |
| TW | 201417631 | 5/2014 |
| TW | 201422045 | 6/2014 |
| TW | 201424454 A | 6/2014 |
| TW | I448198 | 8/2014 |

OTHER PUBLICATIONS

China Patent Office, Office Action mailed Jul. 7, 2014, in Application No. 201210468505.1.

China Patent Office, Office Action mailed Jun. 3, 2014, in Application No. 201110103130.4.

(56) References Cited

OTHER PUBLICATIONS

Taiwan Intellectual Property Office, Office Action mailed Jun. 9, 2014, in Application No. 101124982.
United States Patent and Trademark Office, Office Action mailed May 27, 2014, in U.S. Appl. No. 13/105,780.
China Patent Office, Office Action mailed Jun. 30, 2015, in Application No. 201410171893.6.
China Patent Office, Office Action mailed Aug. 8, 2015, in Application No. 201410172086.6.
United States Patent and Trademark Office, Notice of Allowance mailed May 7, 2015, in U.S. Appl. No. 13/527,475.
China Patent Office, Office Action mailed Aug. 28, 2015, in Application No. 201410322602.9.
China Patent Office, Office Action mailed Oct. 19, 2015, in Application No. 201410322612.2.
Taiwan Intellectual Property Office, Office Action mailed Sep. 17, 2015, in Application No. 103127108.
Taiwan Intellectual Property Office, Office Action mailed Sep. 17, 2015, in Application No. 103127620.
United States Patent and Trademark Office, Notice of Allowance mailed Oct. 22, 2015, in U.S. Appl. No. 13/527,475.
United States Patent and Trademark Office, Office Action mailed Aug. 19, 2015, in U.S. Appl. No. 14/562,432.
China Patent Office, Office Action mailed Nov. 15, 2014, in Application No. 201210166672.0.
Taiwan Intellectual Property Office, Office Action mailed Sep. 25, 2014, in Application No. 101148716.
United States Patent and Trademark Office, Notice of Allowanced mailed Apr. 9, 2015, in U.S. Appl. No. 13/527,475.
United States Patent and Trademark Office, Office Action mailed Dec. 2, 2014, in U.S. Appl. No. 13/527,475.
United States Patent and Trademark Office, Office Action mailed Jan. 15, 2015, in U.S. Appl. No. 14/562,432.
China Patent Office, Office Action mailed Dec. 14, 2015, in Application No. 201210166672.0.
Taiwan Intellectual Property Office, Office Action mailed Nov. 13, 2015, in Application No. 103141628.
United States Patent and Trademark Office, Office Action mailed Jan. 13, 2016, in U.S. Appl. No. 14/451,656.
United States Patent and Trademark Office, Office Action mailed Dec. 17, 2015, in U.S. Appl. No. 14/459,167.
United States Patent and Trademark Office, Notice of Allowance mailed Jan. 21, 2016, in U.S. Appl. No. 14/562,432.
United States Patent and Trademark Office, Office Action mailed Dec. 30, 2015, in U.S. Appl. No. 14/593,734.
United States Patent and Trademark Office, Office Action mailed Dec. 3, 2015, in U.S. Appl. No. 14/819,200.
China Patent Office, Office Action mailed Mar. 2, 2016, in Application No. 201410172086.6.
China Patent Office, Office Action mailed Mar. 3, 2016, in Application No. 201410322612.2.
Taiwan Intellectual Property Office, Office Action mailed Apr. 18, 2016, in Application No. 103140989.
United States Patent and Trademark Office, Notice of Allowance mailed Mar. 30, 2016, in U.S. Appl. No. 14/562,432.

* cited by examiner

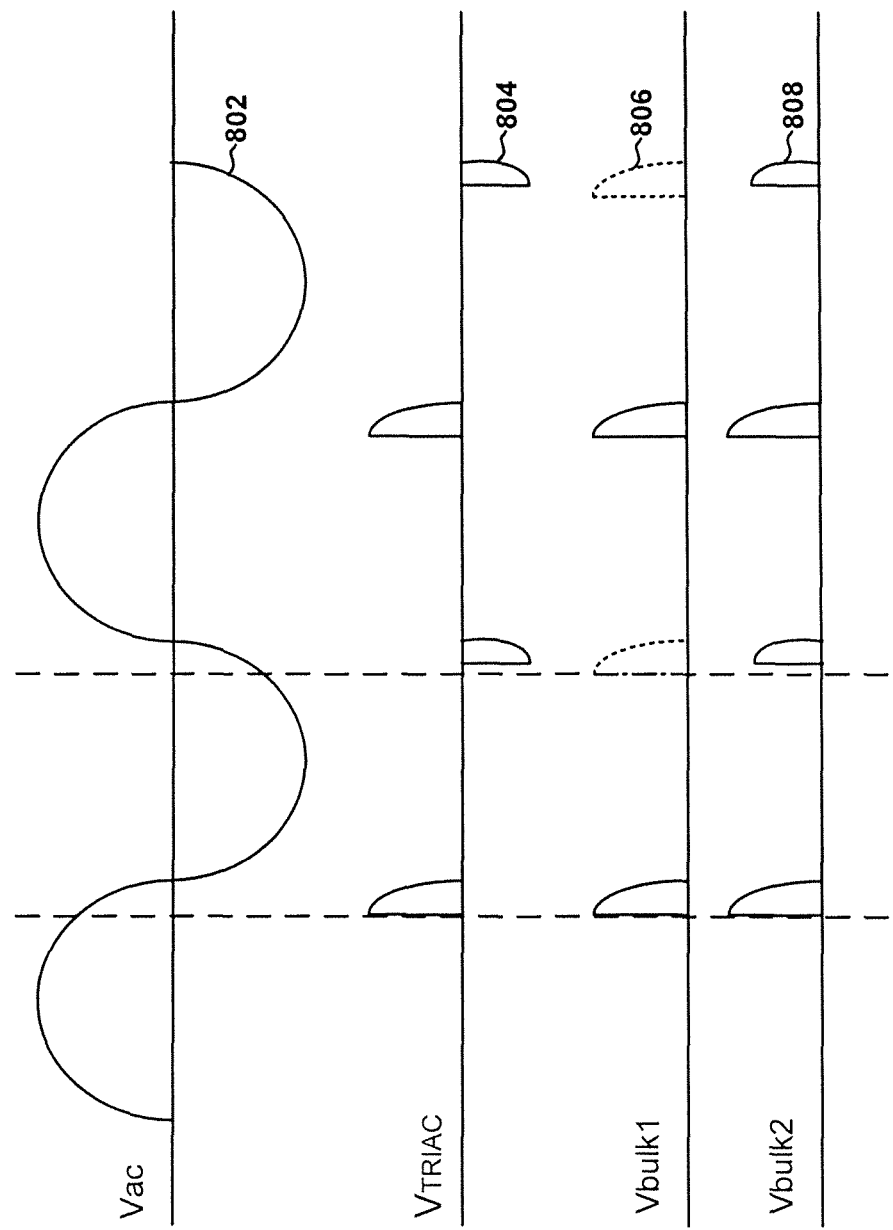

SYSTEMS AND METHODS FOR DIMMING CONTROL USING TRIAC DIMMERS

1. CROSS-REFERENCES TO RELATED APPLICATIONS

This application claims priority to Chinese Patent Application No. 201210468505.1, filed Nov. 12, 2012, commonly assigned, incorporated by reference herein for all purposes. Additionally, this application is related to U.S. patent application Ser. Nos. 13/105,780 and 13/527,475, both of which are incorporated by reference herein for all purposes.

2. BACKGROUND OF THE INVENTION

The present invention is directed to integrated circuits. More particularly, the invention provides systems and methods for dimming control using TRIAC dimmers. Merely by way of example, the invention has been applied to systems for driving light emitting diodes (LEDs). But it would be recognized that the invention has a much broader range of applicability.

Lighting systems including light emitting diodes (LEDs) often use a conventional light dimmer (e.g., wall mounted) that includes a Triode for Alternating Current (TRIAC) to adjust the brightness of LEDs. A TRIAC is bidirectional and currents can flow through a TRIAC in either direction (e.g., into the TRIAC or out of the TRIAC). A TRIAC can be triggered by a gate current (e.g., flowing in either direction) which is often generated by applying a voltage (e.g., a positive voltage or a negative voltage) to a gate electrode of a TRIAC. Once triggered, the TRIAC continues to conduct a current until the current drops below a certain threshold (e.g., a holding current).

FIG. 1 is a simplified diagram showing a conventional LED lighting system using a TRIAC dimmer. For example, the lighting system 100 implements a primary side regulation scheme and a flyback structure with single-stage power-factor-correction (PFC) for driving one or more LEDs 172. The system 100 includes a controller 102, an AC supply component 122, a TRIAC dimmer 118, a full wave rectifying bridge 124, capacitors 126, 136, 140, 150 and 170, resistors 128, 130, 134, 138, 146, 148, 154 and 156, power switches 132 and 152, diodes 142, 144 and 168, and a transformer including a primary winding 162, a secondary winding 164, and an auxiliary winding 166. The controller 102 includes terminals 104, 106, 108, 110, 112, 114, 116 and 120. For example, the power switch 132 and the power switch 152 are transistors. In another example, a TRIAC dimmer 118 is a dimmer that includes a Triode for Alternating Current (TRIAC).

As shown in FIG. 1, the TRIAC dimmer 118 processes an AC input signal 121 from the AC supply component 122, and generates a voltage signal 123 which is processed by the full wave rectifying bridge 124 in order to generate a voltage signal 174 (e.g., $V_{bulk}$). The TRIAC dimmer 118 is associated with a dimming period including an on period and an off period. During an on period of the TRIAC dimmer 118, the voltage signal 174 is approximately equal to the AC input signal 121 in magnitude. During an off period of the TRIAC dimmer 118, the voltage signal 174 has a low magnitude (e.g., approximately zero). The capacitor 150 (e.g., $C_1$) is charged in response to the voltage signal 174 (e.g., $V_{bulk}$) through the resistor 138 (e.g., $R_3$), and a voltage signal 176 is generated at the terminal 112 (e.g., terminal VCC). If the voltage signal 176 exceeds an under-voltage-lock-out (UVLO) threshold voltage, the controller 102 is activated, and outputs a modulation signal 178 (e.g., a pulse-width-modulation (PWM) signal) through the terminal 116 (e.g., terminal GATE) in order to close (e.g., to turn on) or open (e.g., to turn off) the switch 152 (e.g., M2) for normal operation of the system 100. A voltage divider circuit including the resistor 130 (e.g., $R_2$) and the resistor 134 (e.g., $R_4$) generates a voltage signal 179 based on at least information associated with the voltage signal 174 (e.g., $V_{bulk}$). The controller 102 detects the signal 179 at the terminal 106 (e.g., terminal $V_S$) in order to affect the power factor and determine the status of the TRIAC dimmer.

When the controller 102 changes the modulation signal 178 to close (e.g., to turn on) the switch 152 (e.g., M2), a primary current 180 flows through the primary winding 162, and a current-sensing signal 188 is generated through the resistor 154 (e.g., $R_S$). The controller 102 detects the current-sensing signal 188 at the terminal 120 (e.g., terminal CS). For example, the peak values of the current-sensing signal 188 affect the signal 178 to open (e.g., to turn off) the switch 152 in each cycle. An auxiliary current 182 flows through the auxiliary winding 166 to charge the capacitor 150 (e.g., $C_1$), and a voltage signal 184 is generated at the auxiliary winding 166. A voltage divider circuit including the resistor 146 (e.g., $R_5$) and the resistor 148 (e.g., $R_6$) generates a voltage signal 186 based on at least information associated with the voltage signal 184. The controller 102 receives the signal 186 at the terminal 114 (e.g., terminal ZCD) in order to detect the end of a demagnetization process associated with the transformer including the secondary winding 164. In addition, the capacitor 170 is used to maintain output voltage for stable current output to the LEDs 172. During the on period of the TRIAC dimmer 118, the power switch 132 (e.g., M1) is open (e.g., off). During the off period of the TRIAC dimmer 118, the power switch 132 is closed (e.g., on) to provide a bleeding current in order for the TRIAC dimmer 118 to operate normally.

FIG. 2 is a simplified conventional diagram of the controller 102 as shown in FIG. 1. The controller 102 includes a comparator 202, an error amplifier including a comparator 204 and a switch 205, a logic control component 206, a gate drive component 208, a signal generator 210 (e.g., a PWM signal generator), a multiplier 212, and a current regulation component 214. For example, the PWM signal generator is configured to generate one or more pulse-width-modulation signals. In another example, the PWM signal generator includes a comparator.

As shown in FIG. 1 and FIG. 2, the comparator 204 receives the signal 179 and a threshold signal 226 in order to detect the status of the TRIAC dimmer 118, and outputs a dimming signal 228. The switch 205 is closed or open in response to the dimming signal 228 to affect the output current in order to adjust the brightness of the LEDs 172 (e.g., to adjust the brightness of the LEDs 172 linearly as a function of the output current). The current regulation component 214 receives the current sensing signal 188 at the terminal 120 (e.g., terminal CS) to detect the peak values of the primary current 180, and integrates the peak values of the primary current 180 over a demagnetization period associated with the transformer including the primary winding 162 and the secondary winding 164. The multiplier 212 receives a processed signal 216 from the current regulation component 214 and the voltage signal 179 from the terminal 106 (e.g., terminal VS) and generates an output signal 218.

The signal generator 210 receives the current sensing signal 188 and the output signal 218 and generates a signal 220. During an operating cycle, if the modulation signal 178 is at a logic high level and the switch 152 is closed (e.g., turned on), the primary current 180 flowing through the switch 152 increases in magnitude. In response the current sensing signal 188 increases in magnitude. If the signal 188 becomes larger than the output signal 218 in magnitude, the signal generator 210 changes the signal 220 and the controller 102 changes the signal 178 from the logic high level to a logic low level to open (e.g., to turn off) the switch 152. When the switch 152 is opened (e.g., turned off), the transformer including the primary winding 162 and the secondary winding 164 begins the demagnetization process.

The comparator 202 receives the signal 186 and a threshold signal 222 to detect whether the demagnetization process has completed. If the demagnetization process is determined to be completed, the comparator 202 outputs a signal 224 in order to change the signal 178 to the logic high level. During the off period of the TRIAC dimmer 118, the logic control component 206 outputs a signal 230 to close (e.g., to turn on) the switch 132 (e.g., M1) in order to provide a bleeding current for the normal operation of the TRIAC dimmer 118.

The system 100 has some disadvantages. For example, users can perceive the flickering of the LEDs 172 when the conduction angle of the TRIAC dimmer 118 is low (e.g., the portion of the conduction time smaller than 20% of an operating period of the TRIAC dimmer 118) or when the AC input voltage is high.

Hence it is highly desirable to improve the techniques of dimming control.

3. BRIEF SUMMARY OF THE INVENTION

The present invention is directed to integrated circuits. More particularly, the invention provides systems and methods for dimming control using TRIAC dimmers. Merely by way of example, the invention has been applied to systems for driving light emitting diodes (LEDs). But it would be recognized that the invention has a much broader range of applicability.

According to one embodiment, a system for dimming control of one or more light emitting diodes includes one or more signal processing components configured to receive a first signal associated with a TRIAC dimmer, process information associated with the first signal, determine whether the TRIAC dimmer is in a first condition or a second condition, generate a second signal based on at least information associated with the first signal, and send the second signal to a switch. The one or more signal processing components are further configured to, if the TRIAC dimmer is determined to be in the first condition, generate the second signal to cause the switch to be opened and closed corresponding to a modulation frequency, and if the TRIAC dimmer is determined to be in the second condition, generate the second signal to cause the switch to remain closed for a first period of time until at least the TRIAC dimmer changes from the second condition to the first condition.

According to another embodiment, a system for dimming control of one or more light emitting diodes includes a first comparator and a driving component. The first comparator is configured to receive a first threshold signal and an input signal associated with a TRIAC dimmer and generate a comparison signal based on at least information associated with the first threshold signal and the input signal. The driving component is configured to receive the comparison signal, generate an output signal based on at least information associated with the comparison signal, and send the output signal to a switch. The first comparator is further configured to generate the comparison signal at a first logic level if the input signal is larger than the first threshold signal in magnitude and generate the comparison signal at a second logic level if the input signal is smaller than the first threshold signal in magnitude. The driving component is further configured to generate the output signal and cause the switch to remain closed for a period of time until at least the comparison signal changes from the second logic level to the first logic level.

According to yet another embodiment, a system for dimming control of one or more light emitting diodes includes a first comparator, a detection component, and a driving component. The first comparator is configured to receive a first threshold signal and a first signal associated with a TRIAC dimmer and generate a first comparison signal based on at least information associated with the first threshold signal and the first signal. The detection component is configured to receive the first comparison signal, determine a duty cycle of the first comparison signal, process information associated with the duty cycle and a threshold value, and generate a detection signal based on at least information associated with the first comparison signal. The driving component is configured to receive the detection signal, generate a second signal based on at least information associated with the detection signal, and output the second signal to a switch. The first comparator is further configured to generate the first comparison signal at a first logic level if the first signal is larger than the threshold signal in magnitude and generate the first comparison signal at a second logic level if the first signal is smaller than the threshold signal in magnitude. The detection component is further configured to generate the detection signal at a third logic level if the duty cycle of the first comparison signal is larger than the threshold value in magnitude and generate the detection signal at a fourth logic level if the duty cycle of the first comparison signal is smaller than the threshold value in magnitude. The driving component is further configured to, if the detection signal is at the fourth logic level, generate the second signal to cause the switch to remain open for a first period of time.

According to yet another embodiment, a system for detecting a duty cycle of a signal includes a voltage generator, a comparator, and a signal generator. The voltage generator is configured to receive an input signal and generate a first voltage signal based on at least information associated with the input signal. The comparator is configured to receive the first voltage signal and a threshold signal and generate a comparison signal based on at least information associated with the first voltage signal and the threshold signal. The signal processor is configured to receive the comparison signal and the input signal and generate an output signal based on at least information associated with the comparison signal and the input signal. The comparator is further configured to, if the first voltage signal is larger than the threshold signal in magnitude, generate the comparison signal at a first logic level, and if the first voltage signal is smaller than the threshold signal in magnitude, generate the comparison signal at a second logic level. The signal processor is further configured to, if a duty cycle of the input signal is larger than a threshold value, generate the output signal at a third logic level, and if the duty cycle of the input signal is smaller than the threshold value, generate the output signal at a fourth logic level. The signal processor is further configured to, if the input signal changes from a fifth logic level to a sixth logic level and if the comparison signal is at the first logic level, change the output signal from the third logic level to the fourth logic level.

In one embodiment, a method for dimming control of one or more light emitting diodes includes, receiving a first signal associated with a TRIAC dimmer, processing information associated with the first signal, and determining whether the TRIAC dimmer is in a first condition or a second condition based on at least information associated with the first signal. The method further includes generating a second signal based on at least information associated with the first signal, and outputting the second signal to a switch. The process for generating a second signal based on at least information associated with the first signal includes, if the TRIAC dimmer is determined to be in the first condition, generating the second signal to cause the switch to be opened and closed corresponding to a modulation frequency, and if the TRIAC dimmer is determined to be in the second condition, generating the second signal to cause the switch to remain closed for a first period of time until at least the TRIAC dimmer changes from the second condition to the first condition.

In another embodiment, a method for dimming control of one or more light emitting diodes includes, receiving a threshold signal and an input signal associated with a TRIAC dimmer, generating a comparison signal based on at least information associated with the first threshold signal and the input signal, and receiving the comparison signal. The method further includes generating an output signal based on at least information associated with the comparison signal and sending the output signal to a switch. The process for generating a comparison signal based on at least information associated with the first threshold signal and the input signal includes, if the input signal is larger than the first threshold signal in magnitude, generating the comparison signal at a first logic level, and if the input signal is smaller than the first threshold signal in magnitude, generating the comparison signal at a second logic level. The process for sending the output signal to a switch includes sending the output signal to cause the switch to remain closed for a period of time until at least the comparison signal changes from the second logic level to the first logic level.

In yet another embodiment, a method for dimming control of one or more light emitting diodes includes receiving a threshold signal and an input signal associated with a TRIAC dimmer, generating a comparison signal based on at least information associated with the threshold signal and the input signal, and receiving the comparison signal. The method further includes determining a duty cycle of the comparison signal, processing information associated with the duty cycle and a threshold value, and generating a detection signal based on at least information associated with the comparison signal. In addition, the method includes receiving the detection signal, generating an output signal based on at least information associated with the detection signal, and sending the output signal to a switch. The process for generating a comparison signal based on at least information associated with the threshold signal and the input signal includes, if the input signal is larger than the threshold signal in magnitude, generating the comparison signal at a first logic level, and if the input signal is smaller than the threshold signal in magnitude, generating the comparison signal at a second logic level. The process for generating a detection signal based on at least information associated with the comparison signal includes, if the duty cycle of the comparison signal is larger than the threshold value in magnitude, generating the detection signal at a third logic level, and if the duty cycle of the comparison signal is smaller than the threshold value in magnitude, generating the detection signal at a fourth logic level. The process for generating an output signal based on at least information associated with the detection signal includes if the detection signal is at the fourth logic level, generating the output signal to cause the switch to remain open for a first period of time.

In yet another embodiment, a method for detecting a duty cycle of a signal includes receiving an input signal, generating a first voltage signal based on at least information associated with the input signal, and receiving the first voltage signal and a threshold signal. The method further includes generating a comparison signal based on at least information associated with the first voltage signal and the threshold signal, receiving the comparison signal and the input signal, and generating an output signal based on at least information associated with the comparison signal and the input signal. The process for generating a comparison signal based on at least information associated with the first voltage signal and the threshold signal includes, if the first voltage signal is larger than the threshold signal in magnitude, generating the comparison signal at a first logic level, and if the first voltage signal is smaller than the threshold signal in magnitude, generating the comparison signal at a second logic level. The process for generating an output signal based on at least information associated with the comparison signal and the input signal includes, if a duty cycle of the input signal is larger than a threshold value, generating the output signal at a third logic level, if the duty cycle of the input signal is smaller than the threshold value, generating the output signal at a fourth logic level, and if the input signal changes from a fifth logic level to a sixth logic level and if the comparison signal is at the first logic level, changing the output signal from the third logic level to the fourth logic level.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 8 shows simplified timing diagrams analyzing disadvantages of the conventional LED lighting system as shown in FIG. 1.

FIG. 9(*b*) is a simplified diagram showing the system controller as part of the system as shown in FIG. 3 according to yet another embodiment of the present invention.

FIG. 9(*c*) is a simplified diagram showing the system controller as part of the system as shown in FIG. 3 according to yet another embodiment of the present invention.

5. DETAILED DESCRIPTION OF THE INVENTION

The present invention is directed to integrated circuits. More particularly, the invention provides systems and methods for dimming control using TRIAC dimmers. Merely by way of example, the invention has been applied to systems for driving light emitting diodes (LEDs). But it would be recognized that the invention has a much broader range of applicability.

Figure 1:
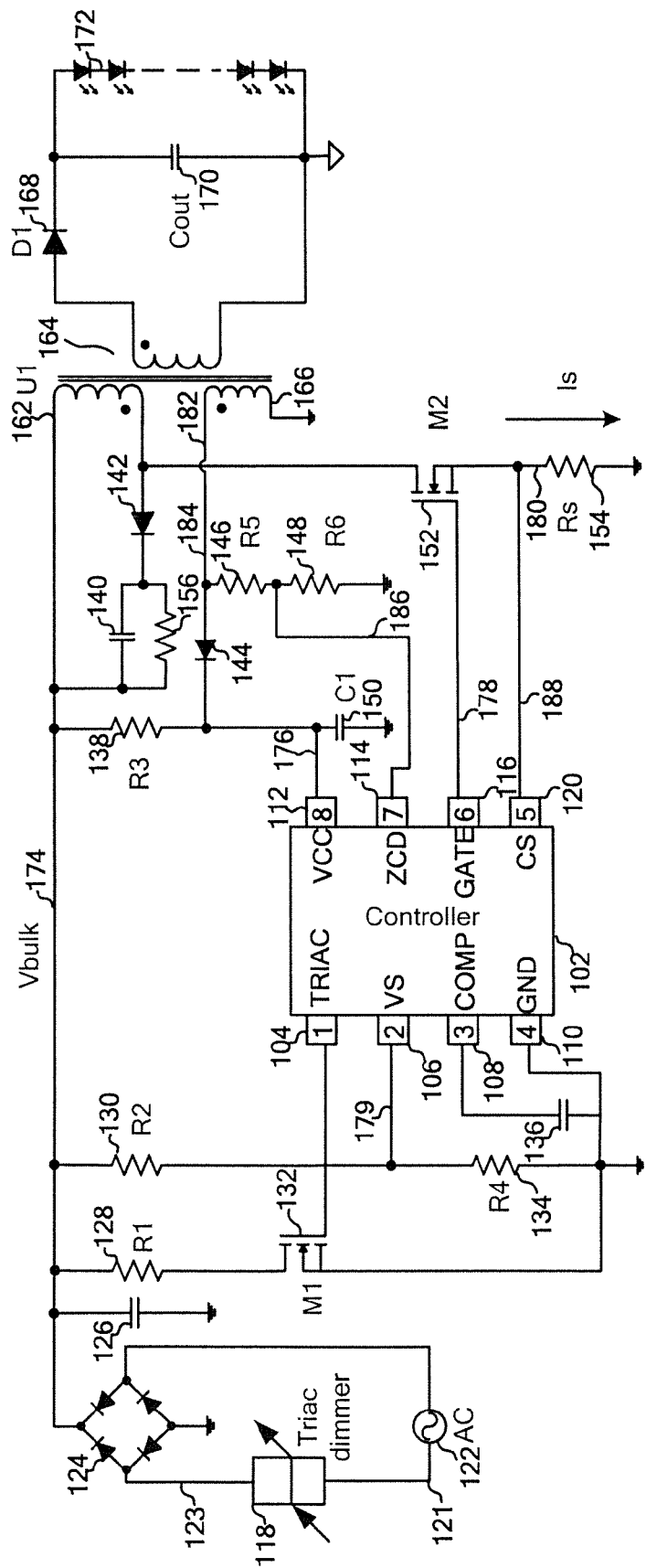
FIG. 1 is a simplified diagram showing a conventional LED lighting system using a TRIAC dimmer.
Figure 2:
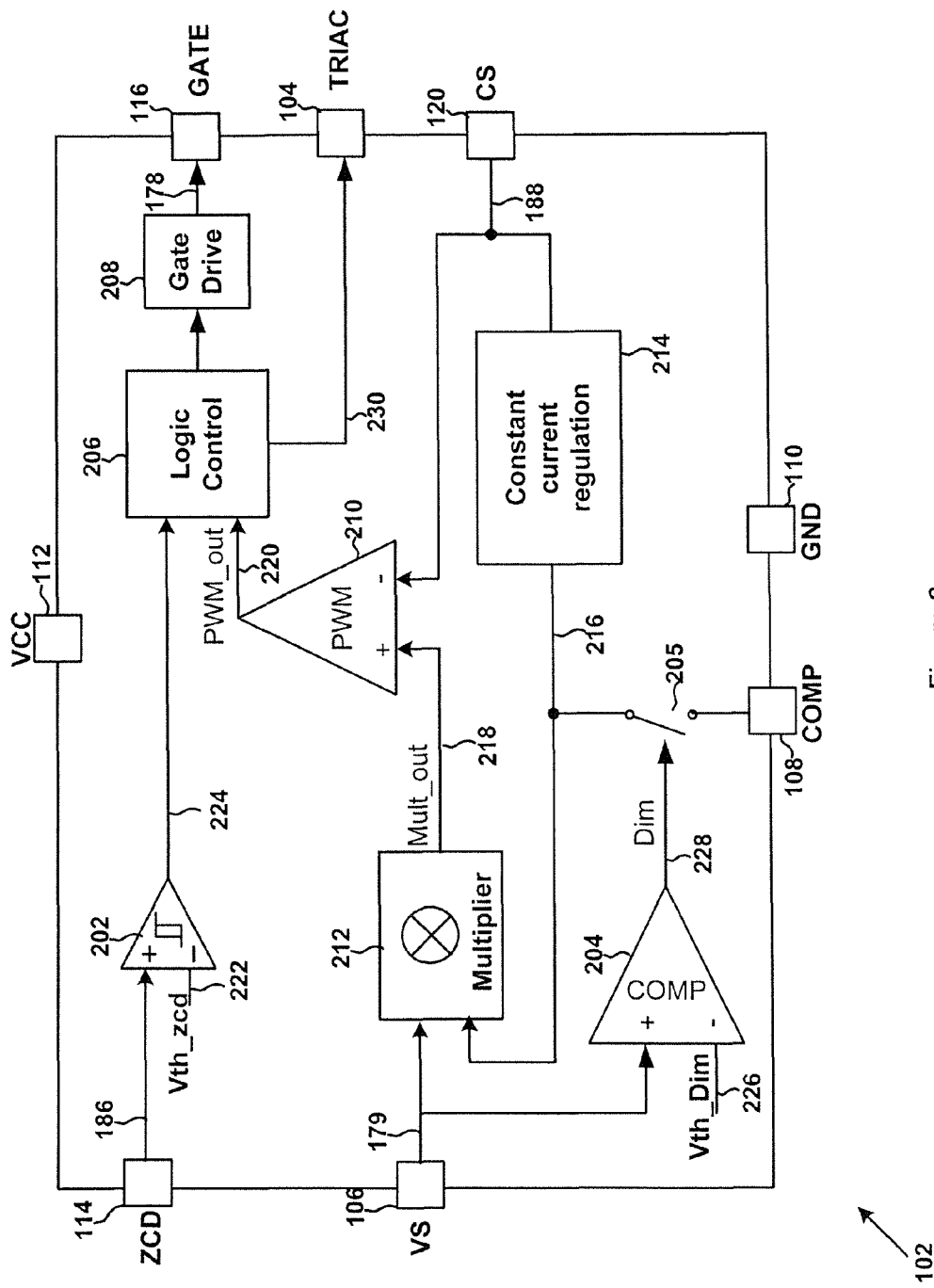
FIG. 2 is a simplified conventional diagram of the controller as shown in FIG. 1.

An important parameter of a TRIAC dimmer is a holding current which indicates a minimum current for normal operation of the TRIAC dimmer. If a TRIAC dimmer is used for driving resistive loads (e.g., incandescent lamps), the holding current requirement can be easily satisfied. But if a TRIAC dimmer is used for driving capacitive loads (e.g., LEDs), additional circuits or components may be needed for satisfying the holding current requirement. For example, as shown in FIG. 1, the switch 132 (e.g., M1) is used for providing a holding current during the off period of the TRIAC dimmer. But the system 100 implements an additional power switch (e.g., M1) and an extra pin (e.g., terminal TRIAC) on the controller 102 which increases the control complexity and system cost.

Figure 3:
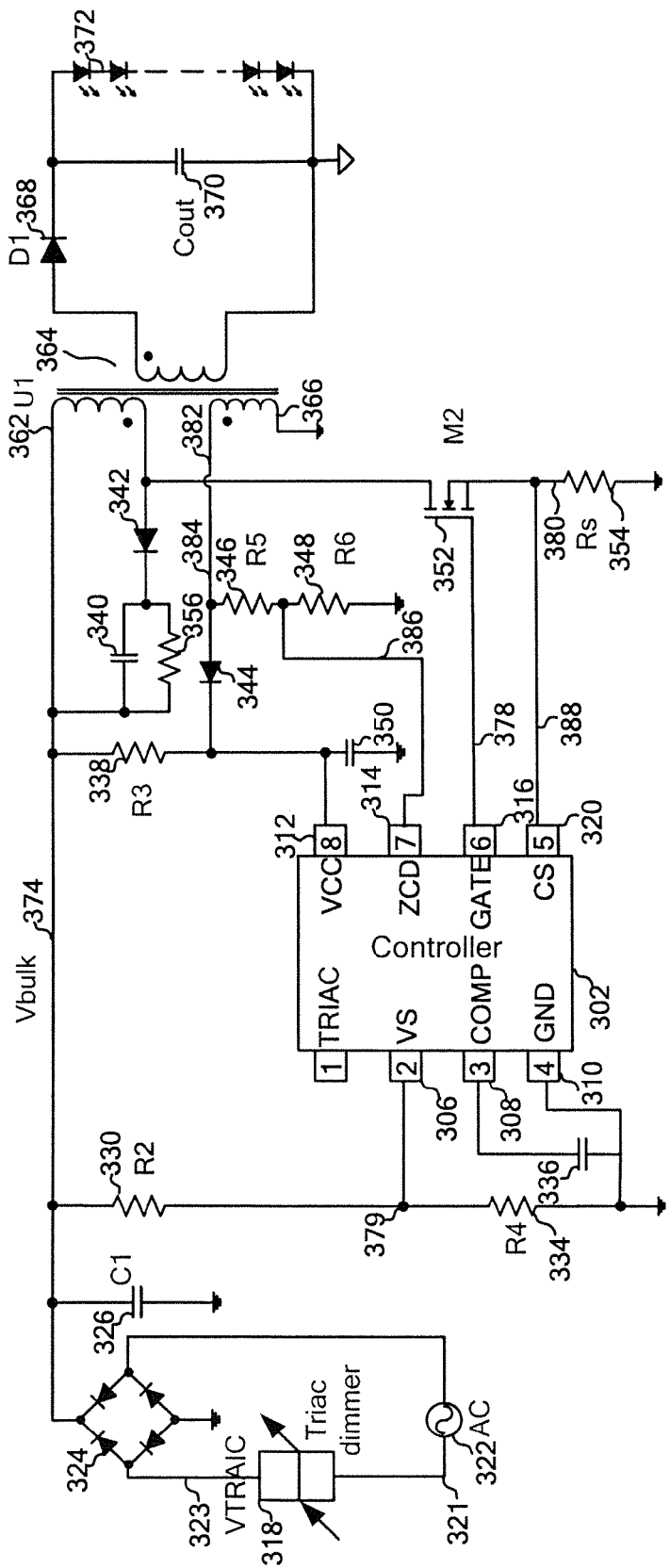
FIG. 3 is a simplified diagram showing a lighting system according to an embodiment of the present invention.

FIG. 3 is a simplified diagram showing a lighting system according to an embodiment of the present invention. This diagram is merely an example, which should not unduly limit the scope of the claims. One of ordinary skill in the art would recognize many variations, alternatives, and modifications. The system 300 includes a system controller 302, an AC supply component 322, a TRIAC dimmer 318, a full wave rectifying bridge 324, capacitors 326, 336, 340, 350 and 370, resistors 330, 334, 338, 346, 348, 354 and 356, a power switch 352, diodes 342, 344 and 368, and a transformer including a primary winding 362, a secondary winding 364, and an auxiliary winding 366. The system controller 302 includes terminals 306, 308, 310, 312, 314, 316 and 320. For example, the power switch 352 is a transistor.

As shown in FIG. 3, a voltage signal 374 (e.g., $V_{bulk}$) is generated when an AC input signal 321 from the AC supply component 322 is processed by the TRIAC dimmer 318 and the rectifying bridge 324 according to certain embodiments. For example, the TRIAC dimmer 318 is associated with a dimming period including an on period and an off period. In another example, during an on period of the TRIAC dimmer 318, the voltage signal 374 is approximately equal to the AC input signal 321 in magnitude. In yet another example, during an off period of the TRIAC dimmer 318, the voltage signal 374 has a low magnitude (e.g., approximately zero). In yet another example, the capacitor 350 (e.g., $C_1$) is charged in response to the voltage signal 374 (e.g., $V_{bulk}$) through the resistor 338 (e.g., $R_3$), and a voltage signal 376 is generated at the terminal 312 (e.g., terminal VCC). In yet another example, the TRIAC dimmer 318 is under an on condition during the on period, and under an off condition during the off period.

According to certain embodiments, if the voltage signal 376 exceeds an under-voltage-lock-out (UVLO) threshold voltage, the system controller 302 is activated, and outputs a control signal 378 through the terminal 316 in order to close (e.g., to turn on) or open (e.g., to turn off) the switch 352 (e.g., M2). For example, the control signal 378 is a pulse-width-modulation (PWM) signal to close (e.g., to turn on) or open (e.g., to turn off) the switch 352 for normal operation of the system 300.

In one embodiment, the switch 352 is a field effect transistor, which can be closed (e.g., turned on) or opened (e.g., turned off) by the control signal 378. For example, the control signal 378 is a voltage signal. In another example, if the control signal 378 is at the logic high level, the field effect transistor is closed (e.g., turned on). In yet another example, if the control signal 378 is at the logic low level, the field effect transistor is opened (e.g., turned off).

In another embodiment, the switch 352 is a bipolar junction transistor, which can be closed (e.g., turned on) or opened (e.g., turned off) by the control signal 378. For example, the control signal 378 is a current signal. In another example, if the control signal 378 is at a high current level, the bipolar transistor is closed (e.g., turned on). In yet another example, if the control signal 378 is at a low current level, the field effect transistor is opened (e.g., turned off).

For example, a voltage divider circuit including the resistor 330 (e.g., $R_2$) and the resistor 334 (e.g., $R_4$) generates a voltage signal 379 based on at least information associated with the voltage signal 374 (e.g., $V_{bulk}$). In another example, the system controller 302 detects the signal 379 at the terminal 306 (e.g., terminal $V_S$) in order to affect the power factor and determine the status of the TRIAC dimmer.

According to another embodiment, when the system controller 302 changes the signal 378 to close (e.g., to turn on) the switch 352 (e.g., M2), a primary current 380 flows through the primary winding 362, and a current-sensing signal 388 is generated through the resistor 354 (e.g., $R_S$). For example, the system controller 302 detects the current-sensing signal 388 at the terminal 320 (e.g., terminal CS). In another example, the peak values of the current-sensing signal 388 affect the signal 378 to open (e.g., to turn off) the switch 352 in each cycle. In yet another example, an auxiliary current 382 flows through the auxiliary winding 366 to charge the capacitor 350, and a voltage signal 384 is generated at the auxiliary winding 366. In yet another example, a voltage divider circuit including the resistor 346 and the resistor 348 generates a voltage signal 386 based on at least information associated with the voltage signal 384. In yet another example, the system controller 302 receives the signal 386 at the terminal 314 (e.g., terminal ZCD) in order to detect the end of a demagnetization process associated with the transformer including the secondary winding 364. In yet another example, during the off period of the TRIAC dimmer 318, the system controller 302 outputs the signal 378 to close (e.g., to turn on) the power switch 352 (e.g., M2) to provide a current flow path in order for the TRIAC dimmer 318 to operate normally. In yet another example, the capacitor 370 is used to maintain output voltage for stable current output to the LEDs 372.

Figure 4:
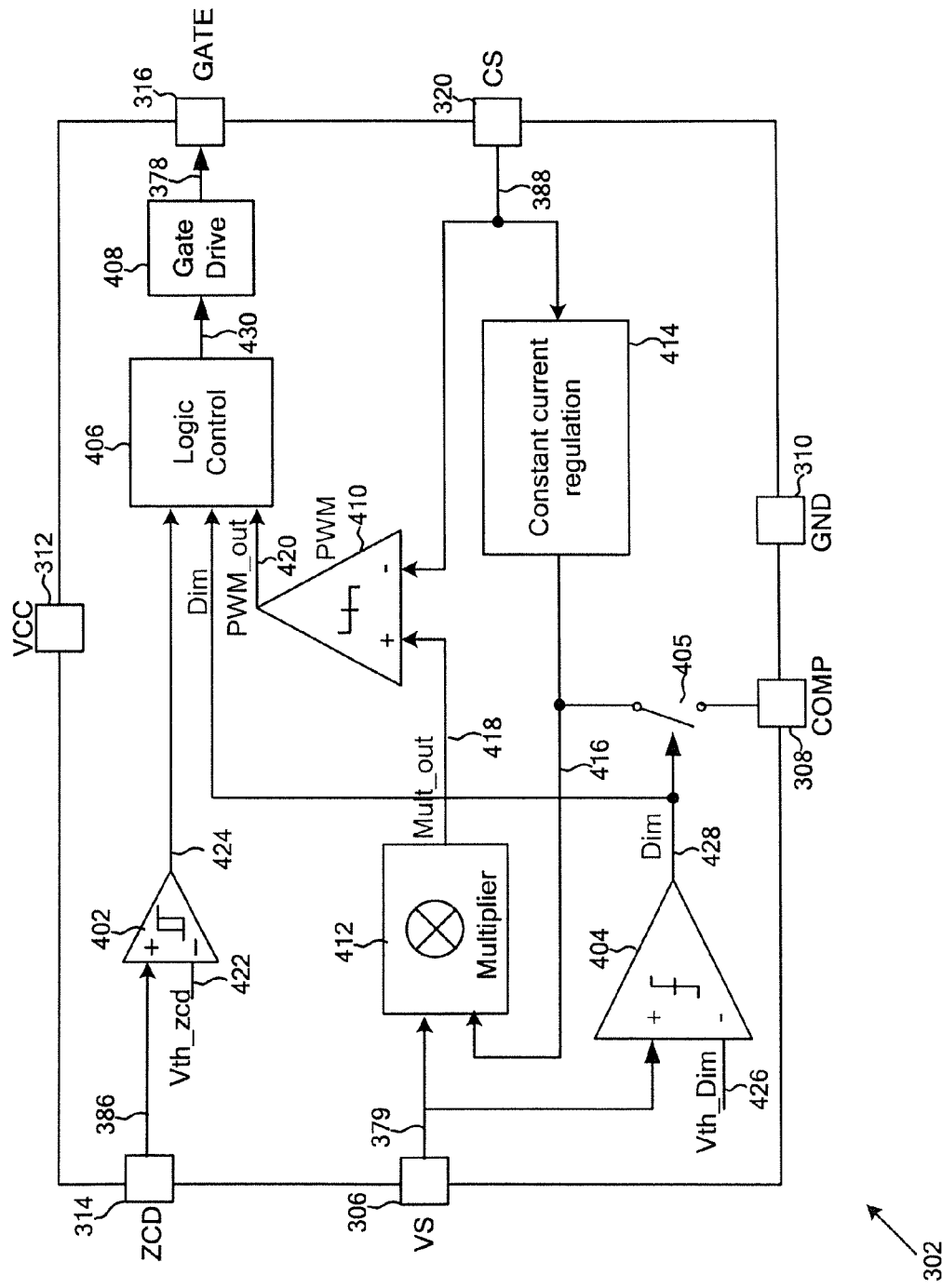
FIG. 4 is a simplified diagram of the system controller as part of the system as shown in FIG. 3 according to an embodiment of the present invention.

FIG. 4 is a simplified diagram of the system controller 302 as part of the system 300 according to an embodiment of the present invention. This diagram is merely an example, which should not unduly limit the scope of the claims. One of ordinary skill in the art would recognize many variations, alternatives, and modifications. The system controller 302 includes a comparator 402, an error amplifier including a comparator 404 and a switch 405, a logic control component 406, a gate drive component 408, a signal generator 410 (e.g., a PWM signal generator), a multiplier 412, and a current regulation component 414.

As shown in FIG. 3 and FIG. 4, the comparator 404 receives the signal 379 and a threshold signal 426 in order to detect the status of the TRIAC dimmer 318, and outputs a dimming signal 428 in some embodiments. For example, if the dimming signal 428 is at the logic high level, the switch 405 is closed or open to affect the output current in order to adjust the brightness of the LEDs 372 (e.g., linearly). In another example, the current regulation component 414 receives the current sensing signal 388 at the terminal 320 (e.g., terminal CS) to detect the peak values of the primary current 380, and integrates the peak values of the primary current 380 over a demagnetization period associated with the transformer that includes the primary winding 362 and the secondary winding 364. In yet another example, the multiplier 412 receives a processed signal 416 from the current regulation component 414 and the voltage signal 379 from the terminal 306 (e.g., terminal VS) and generates an output signal 418.

According to one embodiment, the signal generator 410 receives the current sensing signal 388 and the output signal 418 and generates a signal 420. For example, during an operating cycle, if the switch 352 is closed (e.g., turned on) in response to the signal 378, the primary current 380 flowing through the switch 352 increases in magnitude, and in response the current sensing signal 388 also increases in magnitude. In yet another example, if the signal 388 becomes larger than the output signal 418 in magnitude, the signal generator 410 changes the signal 420 and the system controller 302 changes the signal 378 in order to open (e.g., to turn off) the switch 352.

According to another embodiment, the comparator 402 receives the signal 386 and a threshold signal 422 to detect whether the demagnetization process has completed. For example, if the demagnetization process is determined to be completed, the comparator 402 outputs a signal 424 to change the signal 378 in order to close (e.g., turn on) the switch 352. In another example, the logic control component 406 receives the signal 424, the dimming signal 428 and the signal 420 and outputs a signal 430 to the gate drive component 408.

In one embodiment, if the dimming signal 428 is at the logic high level (e.g., during the on period of the TRIAC dimmer 318), in response to the signals 420 and 424, the logic control component 406 changes the signal 430 between the logic high level and the logic low level to affect the signal 378 in order to close (e.g., to turn on) or open (e.g., to turn off) the switch 352 corresponding to a modulation frequency. For example, the modulation frequency is equal to 1 divided by a corresponding modulation period.

In another embodiment, if the dimming signal 428 is at the logic low level (e.g., during the off period of the TRIAC dimmer 318), the logic control component 406 keeps the signal 430 at the logic high level to affect the signal 378 in order to keep the switch 352 closed (e.g., on) for a first period of time. For example, the first period of time is equal to or larger than the modulation period. In another example, the first period of time is larger than the modulation period. In yet another example, the first period of time is equal to, in duration, the off period of the TRIAC dimmer 318.

Figure 5:
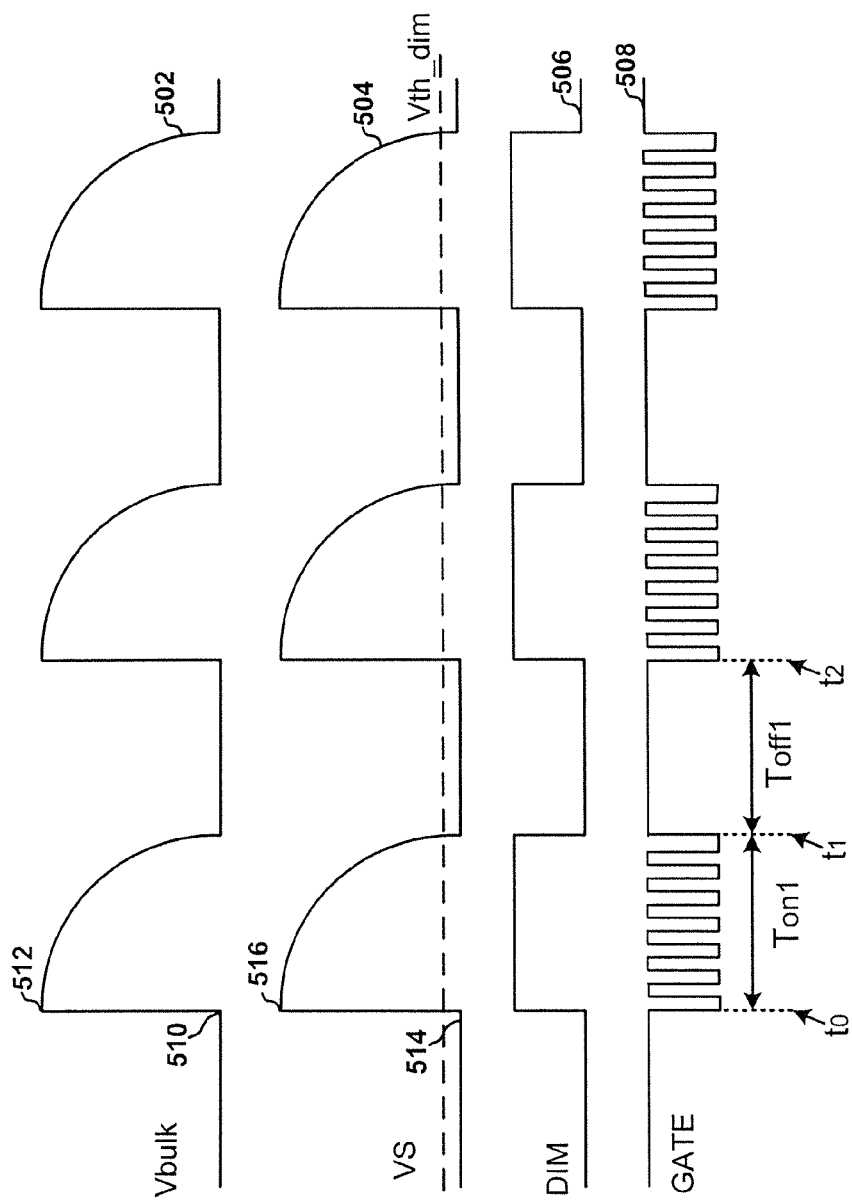
FIG. 5 shows simplified timing diagrams for the system as shown in FIG. 3 according to an embodiment of the present invention.

FIG. 5 shows simplified timing diagrams for the system 300 according to an embodiment of the present invention. These diagrams are merely examples, which should not unduly limit the scope of the claims. One of ordinary skill in the art would recognize many variations, alternatives, and modifications. The waveform 502 represents the voltage signal 374 as a function of time, the waveform 504 represents the signal 379 as a function of time, the waveform 506 represents the dimming signal 428 as a function of time, and the waveform 508 represents the signal 378 as a function of time. Two time periods are shown in FIG. 5, an on time period $T_{on1}$ and an off time period $T_{off1}$. The time period $T_{on1}$ starts at $t_0$ and ends at $t_1$, and the time period $T_{off1}$ starts at $t_1$ and ends at $t_2$. For example, $t_0 \leq t_1 \leq t_2$.

According to one embodiment, at the beginning of the on time period of the TRIAC dimmer 318 (e.g., at $t_0$), the voltage signal 374 (e.g., $V_{bulk}$) changes from a low magnitude 510 (e.g., approximately zero) to a large magnitude 512 and the signal 379 changes from a low magnitude 514 to a large magnitude 516. For example, the signal 379 (e.g., the magnitude 516) is higher than the threshold signal 426 in magnitude, and in response the comparator 404 changes the dimming signal 428 from a logic low level to a logic high level. In another example, during the on time period, the voltage signal 374 (e.g., $V_{bulk}$) and the signal 379 decreases in magnitude over time. In yet another example, if the signal 379 becomes lower than the threshold signal 426 in magnitude, the comparator 404 changes the dimming signal 428 from the logic high level to the logic low level (e.g., at $t_1$). In yet another example, the system controller 302 outputs the signal 378 which changes between the logic low level and the logic high level during the on time period. In yet another example, the signal 378 keeps at the logic high level during the off time period.

When the AC input signal 321 has a low magnitude, the TRIAC dimmer 318 does not suffer much current leakage in certain embodiments. For example, during the off period of the TRIAC dimmer 318, the capacitor 350 accumulates a small amount of charges and the voltage signal 374 (e.g., $V_{bulk}$) has a low magnitude. In another example, a few pulses in the signal 378 from the terminal 316 can reduce the voltage signal 374 to a low magnitude (e.g., approximately zero), and in response the signal 379 has a low magnitude (e.g., approximately zero). In yet another example, the system controller 302 receives the signal 379 at the terminal 306 to detect the status of the TRIAC dimmer 318 in order for the error amplifier including the comparator 204 to operate normally. In yet another example, during the off period of the TRIAC dimmer 318, the current sensing signal 388 has low peak values (e.g., approximately zero) and in response the signal generator 410 changes the signal 420 in order to keep the signal 378 at the logic high level.

Figure 6:
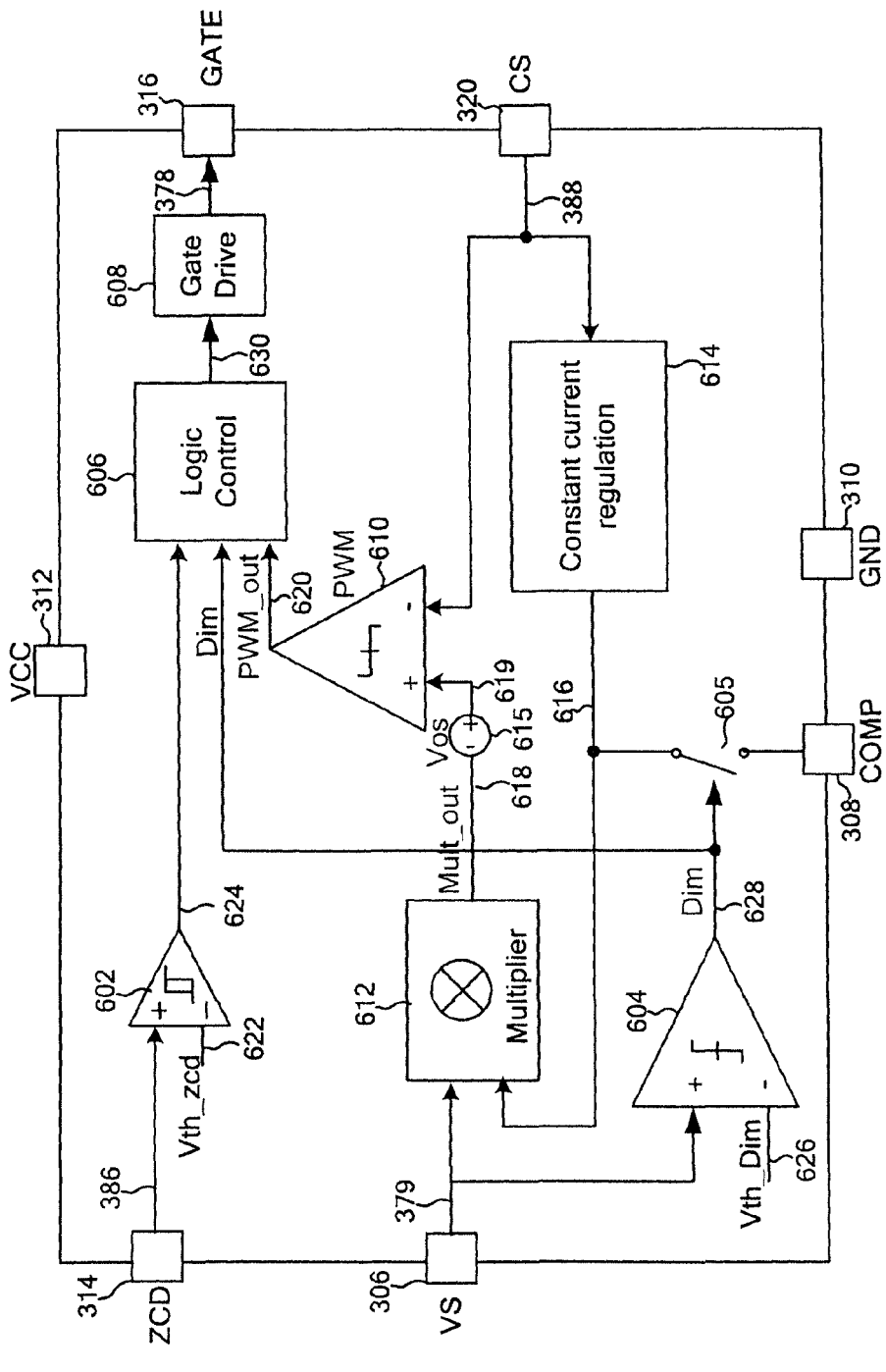
FIG. 6 is a simplified diagram showing the system controller as part of the system as shown in FIG. 3 according to another embodiment of the present invention.

FIG. 6 is a simplified diagram showing the system controller 302 as part of the system 300 according to another embodiment of the present invention. This diagram is merely an example, which should not unduly limit the scope of the claims. One of ordinary skill in the art would recognize many variations, alternatives, and modifications. The system controller 302 includes a comparator 602, an error amplifier including a comparator 604 and a switch 605, a logic control component 606, a gate drive component 608, a signal generator 610 (e.g., a PWM signal generator), a multiplier 612, a current regulation component 614, and an offset component 615.

As shown in FIG. 3 and FIG. 6, the comparator 604 receives the signal 379 and a threshold signal 626 in order to detect the status of the TRIAC dimmer 318, and outputs a dimming signal 628 in some embodiments. For example, the switch 605 is closed or open in response to the dimming signal 628 to affect the output current in order to adjust the brightness of the LEDs 372 (e.g., linearly). In another example, the current regulation component 614 receives the current sensing signal 388 at the terminal 320 (e.g., terminal CS) to detect the peak values of the primary current 380, and integrates the peak values of the primary current 380 over a demagnetization period associated with the transformer including the primary winding 362 and the secondary winding 364. In yet another example, the multiplier 612 receives a processed signal 616 from the current regulation component 614 and the voltage signal 379 from the terminal 306 (e.g., terminal VS) and outputs a signal 618 to the offset component 615. In yet another example, the signal processor 610 receives the current sensing signal 388 and a signal 619 from the offset component 615 and outputs a signal 620.

According to one embodiment, the comparator 602 receives the signal 386 and a threshold signal 622 to detect whether the demagnetization process has completed. For example, if the demagnetization process is determined to be completed, the comparator 602 outputs a signal 624 to change the signal 378 in order to close (e.g., to turn on) the switch 352. In another example, the logic control component 606 receives the signal 624, the dimming signal 628 and the signal 620 and outputs a signal 630 to the gate drive component 608.

In one embodiment, if the dimming signal 628 is at the logic high level (e.g., during the on period of the TRIAC dimmer 318), in response to the signals 620 and 624, the logic control component 606 changes the signal 630 between the logic high level and the logic low level to affect the signal 378 in order to close (e.g., to turn on) or open (e.g., to turn off) the switch 352 corresponding to a modulation frequency. For example, the modulation frequency is equal to 1 divided by a corresponding modulation period.

In another embodiment, if the dimming signal 628 is at the logic low level (e.g., during the off period of the TRIAC dimmer 318), the logic control component 606 keeps the signal 630 at the logic high level to affect the signal 378 in order to keep the switch 352 closed (e.g., on) for a first period of time. For example, the first period of time is equal to or larger than the modulation period. In another example, the first period of time is larger than the modulation period. In yet another example, the first period of time is equal to, in duration, the off period of the TRIAC dimmer 318.

In yet another embodiment, when the AC input signal 321 has a large magnitude, the TRIAC dimmer 318 has a high current leakage and the capacitor 326 accumulates a large amount of charges during the off period of the TRIAC dimmer 318. For example, if pulses in the signal 378 cannot pull the signal 374 (e.g., $V_{bulk}$) down to a low magnitude (e.g., approximately zero), the signal 379 has a magnitude larger than zero. In another example, the current sensing signal 388 has peak values larger than zero during the off period of the TRIAC dimmer 318. In yet another example, because the offset component 615 adds a predetermined offset to the signal 618 to generate the signal 619, the current sensing signal 388 is kept smaller than the signal 619 in magnitude and in response the signal processor 610 outputs the signal 620 to affect the signal 378 in order to keep the switch 352 closed (e.g., on) during the off period of the TRIAC dimmer 318. In yet another example, the signal 374 (e.g., $V_{bulk}$) can be pulled down to a low magnitude (e.g., approximately zero) to keep the signal 378 stable so that the LEDs 372 do not flicker during the off period of the TRIAC dimmer 318.

Figure 7:
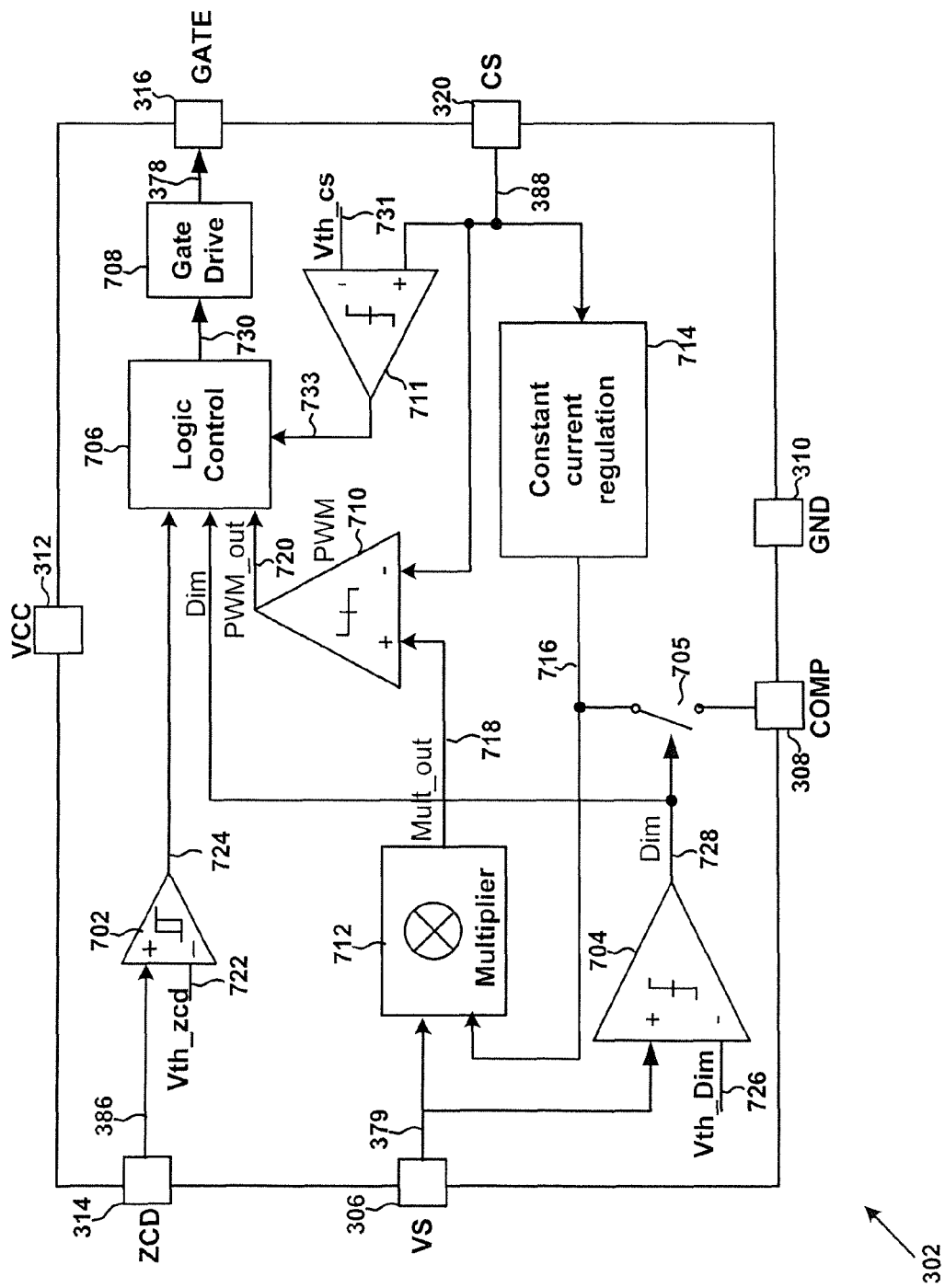
FIG. 7 is a simplified diagram showing the system controller as part of the system as shown in FIG. 3 according to yet another embodiment of the present invention.

FIG. 7 is a simplified diagram showing the system controller 302 as part of the system 300 according to yet another embodiment of the present invention. This diagram is merely an example, which should not unduly limit the scope of the claims. One of ordinary skill in the art would recognize many variations, alternatives, and modifications. The system controller 302 includes comparators 702 and 711, an error amplifier including a comparator 704 and a switch 705, a logic control component 706, a gate drive component 708, a signal generator 710 (e.g., a PWM signal generator), a multiplier 712, and a current regulation component 714.

As shown in FIG. 3 and FIG. 7, the comparator 704 receives the signal 379 and a threshold signal 726 in order to detect the status of the TRIAC dimmer 318, and outputs a dimming signal 728 in some embodiments. For example, the switch 705 is closed or open in response to the dimming signal 728 to affect the output current in order to adjust the brightness of the LEDs 372 (e.g., linearly). In another example, the current regulation component 714 receives the current sensing signal 388 at the terminal 320 (e.g., terminal CS) to detect the peak values of the primary current 380, and integrates the peak values of the primary current 380 over a demagnetization period associated with the transformer including the primary winding 362 and the secondary winding 364. In yet another example, the multiplier 712 receives a processed signal 716 from the current regulation component 714 and the voltage signal 379 from the terminal 306 (e.g., terminal VS) and generates an output signal 718. In yet another example, the signal generator 710 receives the current sensing signal 388 and the output signal 718 and generates a signal 720.

According to one embodiment, the comparator 702 receives the signal 386 and a threshold signal 722 to detect whether the demagnetization process has completed. For example, if the demagnetization process is determined to be completed, the comparator 702 outputs a signal 724 to change the signal 378 in order to close (e.g., to turn on) the switch 352. In another example, the logic control component 706 receives the signal 724, the dimming signal 728 and the signal 720 and outputs a signal 730 to the gate drive component 708.

In one embodiment, if the dimming signal 728 is at the logic high level (e.g., during the on period of the TRIAC dimmer 318), in response to the signals 720 and 724, the logic control component 706 changes the signal 730 between the logic high level and the logic low level to affect the signal 378 in order to close (e.g., to turn on) or open (e.g., to turn off) the switch 352 corresponding to a modulation frequency. For example, the modulation frequency is equal to 1 divided by a corresponding modulation period.

In another embodiment, if the dimming signal 728 is at the logic low level (e.g., during the off period of the TRIAC dimmer 318), the logic control component 706 keeps the signal 730 at the logic high level to affect the signal 378 in order to keep the switch 352 closed (e.g., on) for a first period of time. For example, the first period of time is equal to or larger than the modulation period. In another example, the first period of time is larger than the modulation period. In yet another example, the first period of time is equal to, in duration, the off period of the TRIAC dimmer 318.

In yet another embodiment, the comparator 711 receives the current sensing signal 388 at the terminal 320 (e.g., terminal CS) and a threshold signal 731 and outputs a comparison signal 733 to the logic control component 706. For example, if the current sensing signal 388 is smaller than the threshold signal 731 in magnitude, the comparator 711 changes the comparison signal 733 in order to change the signal 378 in order to turn on the switch 352 (e.g., M2). Thus, the voltage signal 374 (e.g., $V_{bulk}$) is pulled down to a low magnitude (e.g., approximately zero) to keep the signal 378 stable so that the LEDs 372 do not flicker during the off period of the TRIAC dimmer 318, even if the AC input signal 321 has a large magnitude, in certain embodiments. For example, if the current sensing signal 388 is larger than the threshold signal 731 in magnitude, the status of the signal 378 is affected by the signal 720 which is generated based on at least information associated with the signal 718 and the current sensing signal 388.

As discussed above, and further emphasized here, FIG. 4, FIG. 5, FIG. 6 and FIG. 7 are merely examples, which should not unduly limit the scope of the claims. One of ordinary skill in the art would recognize many variations, alternatives, and modifications. For example, the operation of certain components of the system controller 302 illustrated in FIG. 4 also applies to the system controller 302 as shown in FIG. 6 and/or FIG. 7. In another example, the system controller 302 as shown in FIG. 6 or the system controller 302 as shown in FIG. 7 has timing diagrams similar to those as shown in FIG. 5.

FIG. 8 shows simplified timing diagrams analyzing disadvantages of the conventional LED lighting system 100. The waveform 802 represents the AC input signal 121 as a function of time, the waveform 804 represents a voltage signal 123 as a function of time, the waveform 806 represents the voltage signal 174 in ideality as a function of time, and the waveform 808 represents the voltage signal 174 in reality as a function of time.

Referring back to FIG. 1, the TRIAC dimmer 118, because of its intrinsic characteristics, processes positive values and negative values in the AC input signal 121 differently to generate the voltage signal 123 (e.g., as shown by the waveform 804). Ideally, the voltage signal 174 (e.g., $V_{bulk}$) has a same waveform during each on time period of the TRIAC dimmer 118 (e.g., as shown by the waveform 806). But in reality, the waveform of the voltage signal 174 (e.g., $V_{bulk}$) during each on time period of the TRIAC dimmer 118 varies over time (e.g., as shown by the waveform 808). Such variance affects the output current of the system 100. If the conduction angle of the TRIAC dimmer 118 is large, the LEDs 172 are bright enough so that human observers can hardly perceive any flickering. But if the conduction angle of the TRIAC dimmer 118 is small, the LEDs 172 are not very bright. If the current flowing through the LEDs 172 varies in different operating periods, human observers can perceive the flickering of the LEDs 172.

Figure 9A:
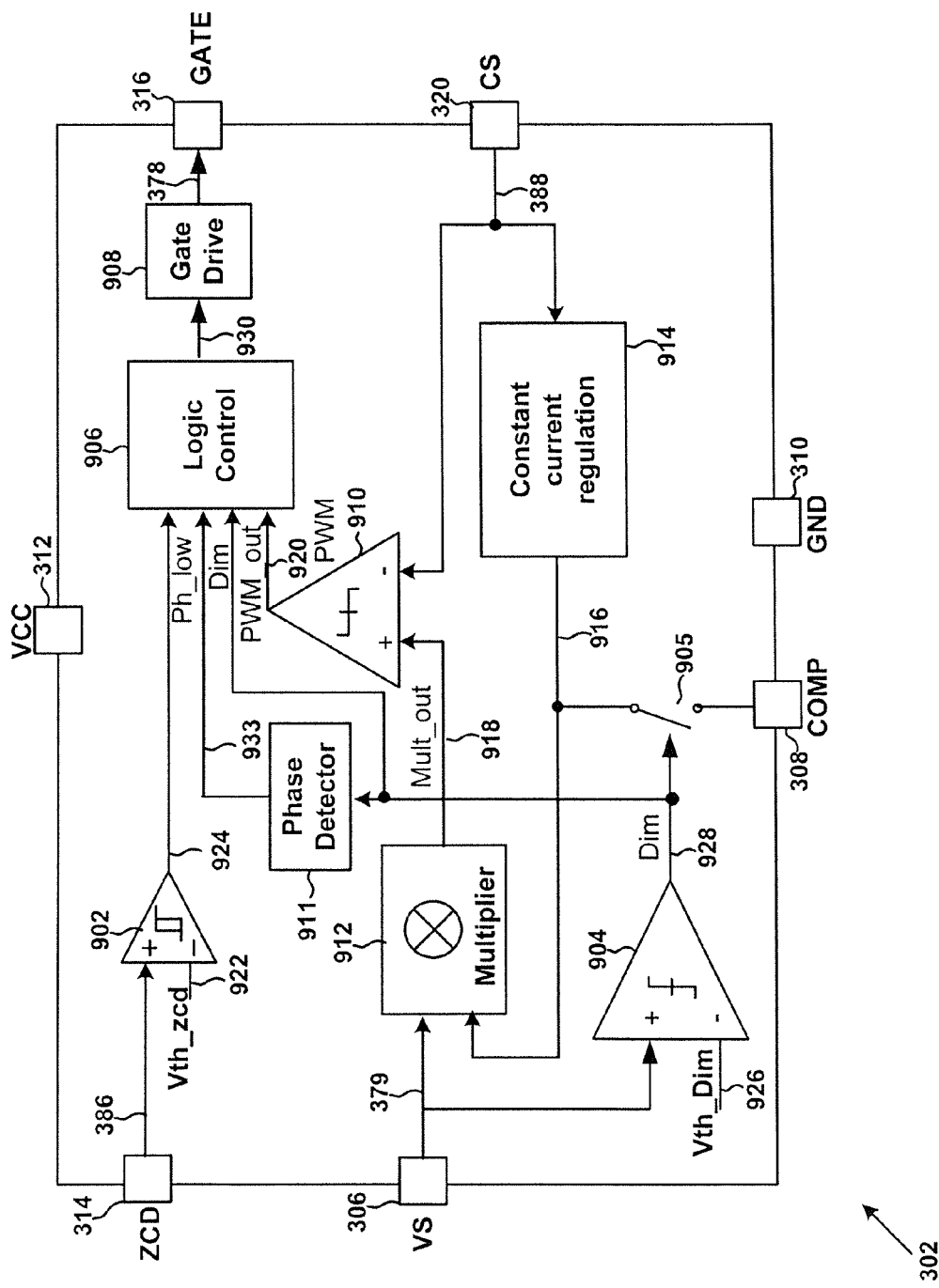
FIG. 9(*a*) is a simplified diagram showing the system controller as part of the system as shown in FIG. 3 according to another embodiment of the present invention.

FIG. 9(a) is a simplified diagram showing the system controller 302 as part of the system 300 according to another embodiment of the present invention. This diagram is merely an example, which should not unduly limit the scope of the claims. One of ordinary skill in the art would recognize many variations, alternatives, and modifications. The system controller 302 includes a comparator 902, an error amplifier including a comparator 904 and a switch 905, a logic control component 906, a gate drive component 908, a signal generator 910 (e.g., a PWM signal generator), a multiplier 912, a current regulation component 914, and a detection component 911. For example, the comparator 902, the comparator 904, the switch 905, the logic control component 906, the gate drive component 908, the signal generator 910, the multiplier 912, and the current regulation component 914 are the same as the comparator 402, the comparator 404 and the switch 405, the logic control component 406, the gate drive component 408, the signal generator 410, the multiplier 412, and the current regulation component 414.

As shown in FIG. 3 and FIG. 9(a), the comparator 904 receives the signal 379 and a threshold signal 926 in order to detect the status of the TRIAC dimmer 318, and outputs a dimming signal 928 (e.g., the signal 428) in some embodiments. For example, the switch 905 is closed or open in response to the dimming signal 928 to affect the output current in order to adjust the brightness of the LEDs 372 (e.g., linearly). In another example, the current regulation component 914 receives the current sensing signal 388 at the terminal 320 (e.g., terminal CS) to detect the peak values of the primary current 380, and integrates the peak values of the primary current 380 over a demagnetization period associated with the transformer including the primary winding 362 and the secondary winding 364. In yet another example, the multiplier 912 receives a processed signal 916 (e.g., the signal 416) from the current regulation component 914 and the voltage signal 379 from the terminal 306 (e.g., terminal VS) and outputs a signal 918 (e.g., the signal 418). In yet another example, the signal processor 910 receives the current sensing signal 388 and the signal 918 and outputs a signal 920 (e.g., the signal 420).

According to another embodiment, a duty cycle of the dimming signal 928 represents the conduction angle of the TRIAC dimmer 318. For example, the detection component 911 receives the dimming signal 928 to determine the duty cycle of the dimming signal 928 and outputs a signal 933 to the logic control component 906. In another example, if the duty cycle of the dimming signal 928 is determined to be smaller than a threshold, the system controller 302 is configured to change the signal 378 to open (e.g., to turn off) the switch 352 in order to turn off the system 300. In yet another example, the comparator 902 receives the signal 386 and a threshold signal 922 to detect whether the demagnetization process has completed. In yet another example, if the demagnetization process is determined to be completed, the comparator 902 outputs a signal 924 (e.g., the signal 424) to the logic control component 906 which also receives the dimming signal 928 and the signal 920 and outputs a signal 930 to the gate drive component 908.

Figure 9B:
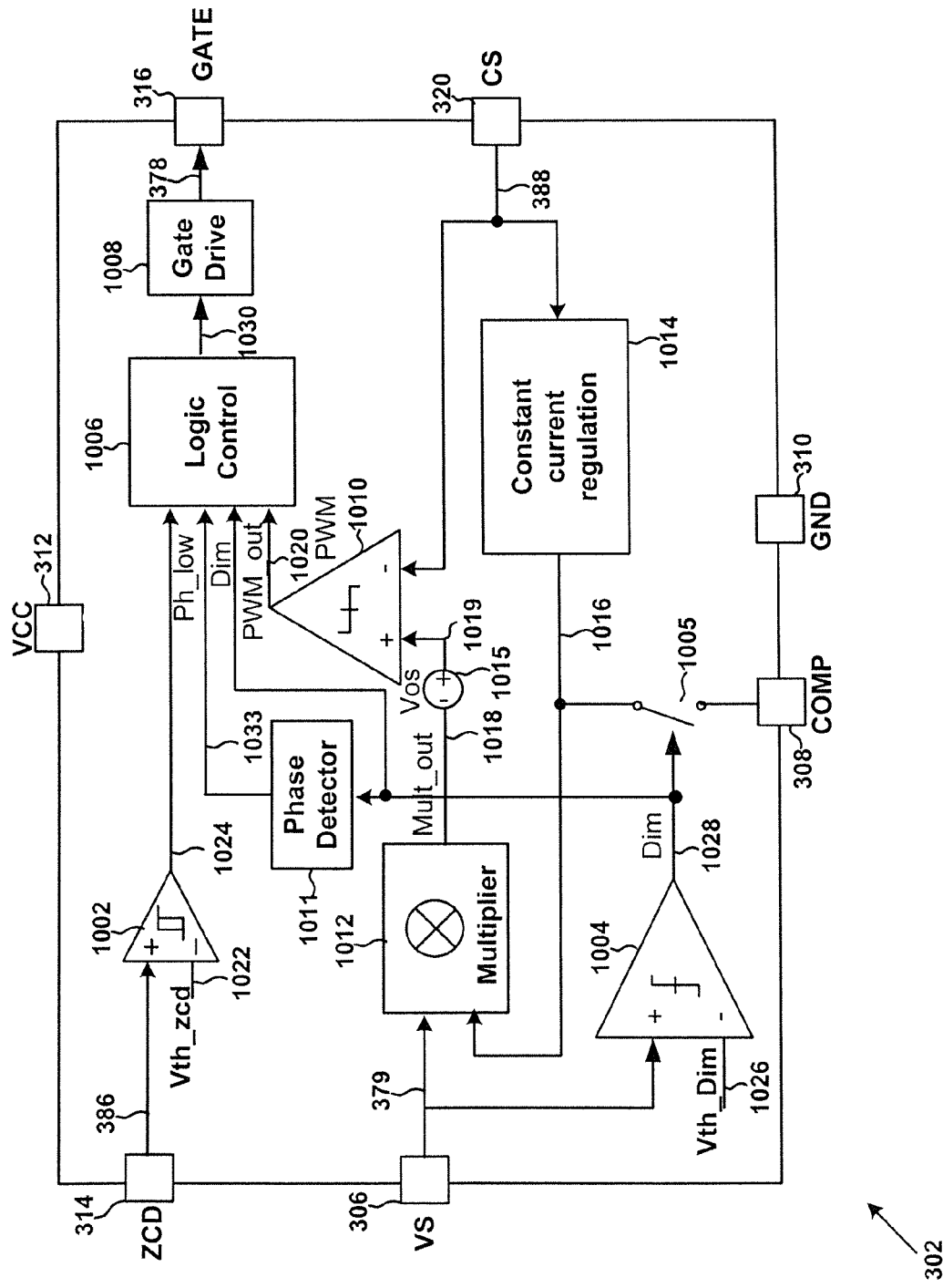

FIG. 9(b) is a simplified diagram showing the system controller 302 as part of the system 300 according to yet another embodiment of the present invention. This diagram is merely an example, which should not unduly limit the scope of the claims. One of ordinary skill in the art would recognize many variations, alternatives, and modifications. The system controller 302 includes a comparator 1002, an error amplifier including a comparator 1004 and a switch 1005, a logic control component 1006, a gate drive component 1008, a signal generator 1010 (e.g., a PWM signal generator), a multiplier 1012, a current regulation component 1014, a detection component 1011 and an offset component 1015. For example, the comparator 1002, the comparator 1004, the switch 1005, the logic control component 1006, the gate drive component 1008, the signal generator 1010, the multiplier 1012, the current regulation component 1014, and the offset component 1015 are the same as the comparator 602, the comparator 604 and the switch 605, the logic control component 606, the gate drive component 608, the signal generator 610, the multiplier 612, the current regulation component 614, and the offset component 615.

As shown in FIG. 3 and FIG. 9(b), the comparator 1004 receives the signal 379 and a threshold signal 1026 in order to detect the status of the TRIAC dimmer 318, and outputs a dimming signal 1028 (e.g., the signal 628) in some embodiments. For example, the switch 1005 is closed or open in response to the dimming signal 1028 to affect the output current in order to adjust the brightness of the LEDs 372 (e.g., linearly). In another example, the current regulation component 1014 receives the current sensing signal 388 at the terminal 320 (e.g., terminal CS) to detect the peak values of the primary current 380, and integrates the peak values of the primary current 380 over a demagnetization period associated with the transformer including the primary winding 362 and the secondary winding 364. In yet another example, the multiplier 1012 receives a processed signal 1016 (e.g., the signal 616) from the current regulation component 1014 and the voltage signal 379 from the terminal 306 (e.g., terminal VS) and outputs a signal 1018 to the offset component 1015. In yet another example, the signal processor 910 receives the current sensing signal 388 and a signal 1019 (e.g., the signal 619) from the offset component 1015 and outputs a signal 1020 (e.g., the signal 920) to the logic control component 1006.

According to another embodiment, a duty cycle of the dimming signal 1028 represents the conduction angle of the TRIAC dimmer 318. For example, the detection component 1011 receives the dimming signal 1028 to determine the duty cycle of the dimming signal 1028 and outputs a signal 1033 to the logic control component 1006. In another example, if the duty cycle of the dimming signal 1028 is determined to be smaller than a threshold, the system controller 302 is configured to change the signal 378 to open (e.g., to turn off) the switch 352 in order to turn off the system 300. In yet another example, the comparator 1002 receives the signal 386 and a threshold signal 1022 to detect whether the demagnetization process has completed. In yet another example, if the demagnetization process is determined to be completed, the comparator 1002 outputs a signal 1024 (e.g., the signal 624) to the logic control component 1006 which outputs a signal 1030 to the gate drive component 1008.

Figure 9C:
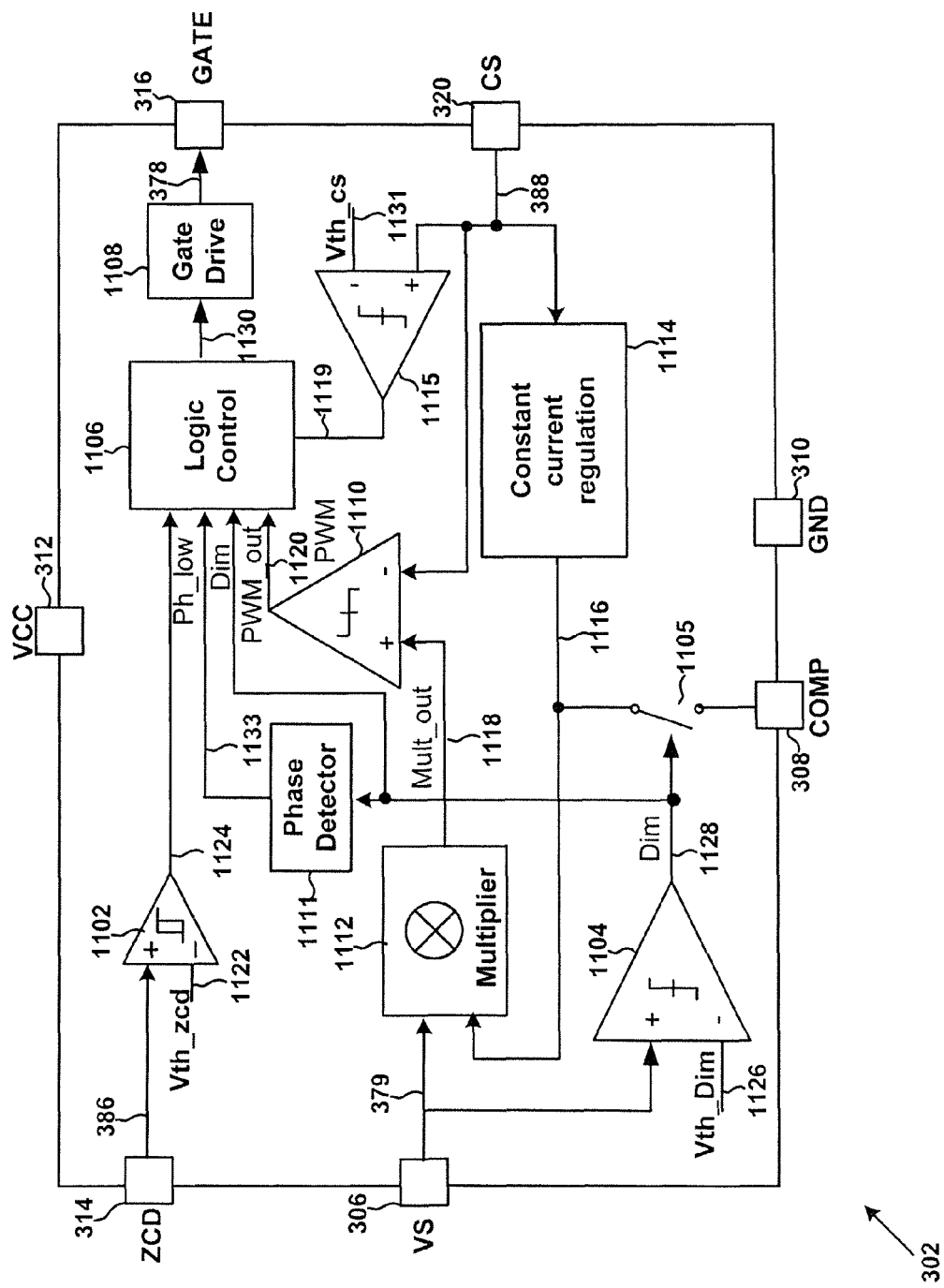

FIG. 9(c) is a simplified diagram showing the system controller 302 as part of the system 300 according to yet another embodiment of the present invention. This diagram is merely an example, which should not unduly limit the scope of the claims. One of ordinary skill in the art would recognize many variations, alternatives, and modifications. The system controller 302 includes a comparator 1102, an error amplifier including a comparator 1104 and a switch 1105, a logic control component 1106, a gate drive component 1108, a signal generator 1110 (e.g., a PWM signal generator), a multiplier 1112, a current regulation component 1114, a detection component 1111 and a comparator 1115. For example, the comparator 1102, the comparator 1104, the switch 1105, the logic control component 1106, the gate drive component 1108, the signal generator 1110, the multiplier 1112, the current regulation component 1114, and the comparator 1115 are the same as the comparator 702, the comparator 704, the switch 705, the logic control component 706, the gate drive component 708, the signal generator 710, the multiplier 712, the current regulation component 714, and the comparator 711.

As shown in FIG. 3 and FIG. 9(c), the comparator 1104 receives the signal 379 and a threshold signal 1126 in order to detect the status of the TRIAC dimmer 318, and outputs a dimming signal 1128 (e.g., the signal 728) in some embodiments. For example, the switch 1105 is closed or open in response to the dimming signal 1128 to affect the output current in order to adjust the brightness of the LEDs 372 (e.g., linearly). In another example, the current regulation component 1114 receives the current sensing signal 388 at the terminal 320 (e.g., terminal CS) to detect the peak values of the primary current 380, and integrates the peak values of the primary current 380 over a demagnetization period associated with the transformer including the primary winding 362 and the secondary winding 364. In yet another example, the multiplier 1112 receives a processed signal 1116 (e.g., the signal 716) from the current regulation component 1114 and the voltage signal 379 from the terminal 306 (e.g., terminal VS) and outputs a signal 1118 (e.g., the signal 718) to the signal processor 1110. In yet another example, the signal processor 1110 receives the current sensing signal 388 and the signal 1118 and outputs a signal 1120 (e.g., the signal 720) to the logic control component 1106.

According to another embodiment, a duty cycle of the dimming signal 1128 represents the conduction angle of the TRIAC dimmer 318. For example, the detection component 1111 receives the dimming signal 1128 to determine the duty cycle of the dimming signal 1128 and outputs a signal 1133 to the logic control component 1106. In another example, if the duty cycle of the dimming signal 1128 is determined to be smaller than a threshold, the system controller 302 is configured to change the signal 378 to open (e.g., to turn off) the switch 352 in order to turn off the system 300. In yet another example, the comparator 1115 receives the current sensing signal 388 at the terminal 320 (e.g., terminal CS) and a threshold signal 1131 and outputs a comparison signal 1119 (e.g., the signal 733) to the logic control component 1106. In yet another example, the comparator 1102 receives the signal 386 and a threshold signal 1122 to detect whether the demagnetization process has completed. In yet another example, if the demagnetization process is determined to be completed, the comparator 1102 outputs a signal 1124 (e.g., the signal 724) to the logic control component 1106 which outputs a signal 1130 to the gate drive component 1108.

Figure 10:
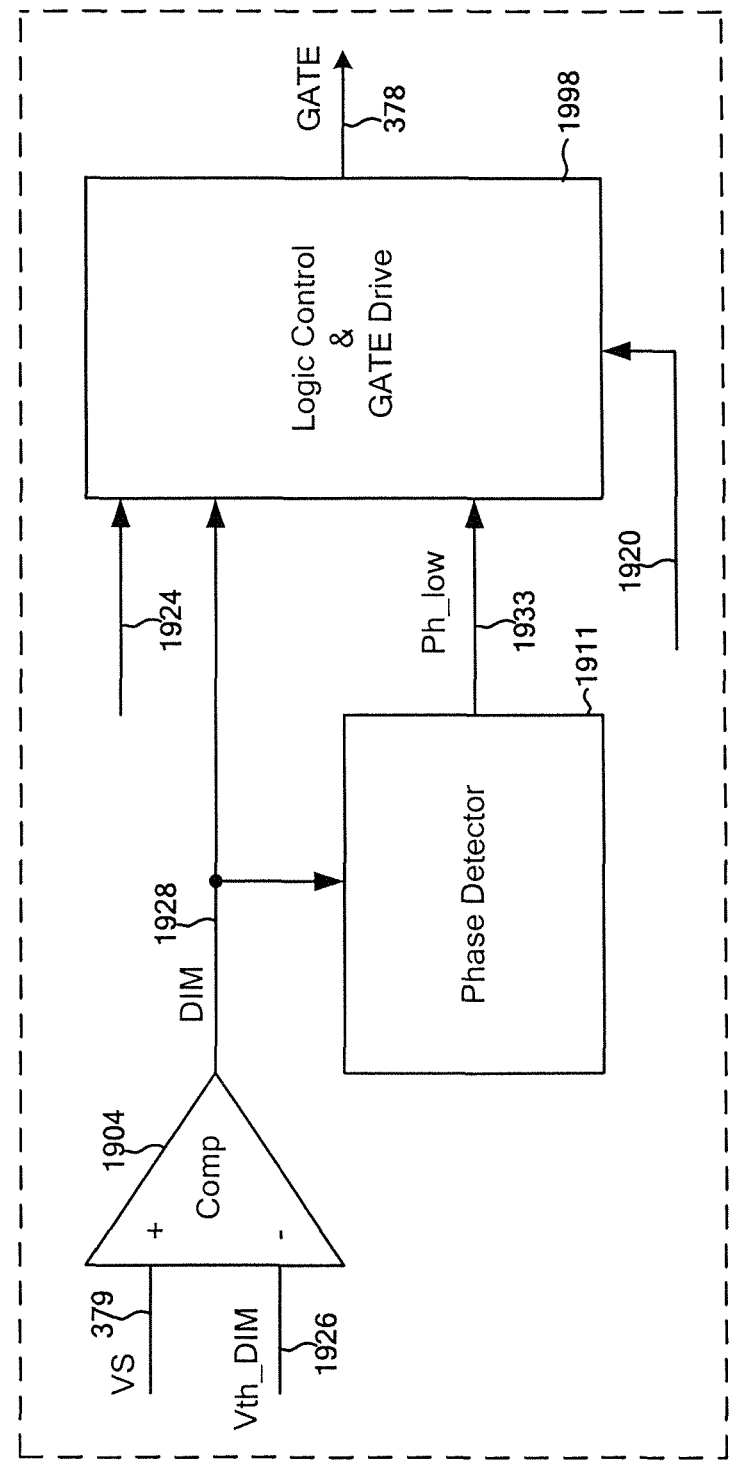
FIG. 10 is a simplified diagram showing certain components of the system controller as part of the system as shown in FIG. 9(*a*), FIG. 9(*b*), and/or FIG. 9(*c*) according to some embodiments of the present invention.

FIG. 10 is a simplified diagram showing certain components of the system controller 302 as part of the system 300 as shown in FIG. 9(a), FIG. 9(b), and/or FIG. 9(c) according to some embodiments of the present invention. This diagram is merely an example, which should not unduly limit the scope of the claims. One of ordinary skill in the art would recognize many variations, alternatives, and modifications. As shown in FIG. 10, the system controller includes a comparator 1904, a detection component 1911, and a logic control and gate drive component 1998. For example, the comparator 1904 is the same as the comparator 904, the comparator 1004, or the comparator 1104. In another example, the detection component 1911 is the same as the detection component 911, the detection component 1011, or the detection component 1111. In yet another example, the logic control and gate drive component 1998 includes the logic control component 906 and the gate drive component 908 as shown in FIG. 9(a), the logic control component 1006 and the gate drive component 1008 as shown in FIG. 9(b), or the logic control component 1106 and the gate drive component 1108 as shown in FIG. 9(c).

As shown in FIG. 10, the comparator 1904 compares the signal 379 and a threshold signal 1926 (e.g., the threshold signal 926, the threshold signal 1026, or the threshold signal 1126) and outputs a dimming signal 1928 (e.g., the dimming signal 928, the dimming signal 1028, or the dimming signal 1128) in some embodiments. For example, the phase detector 1911 receives the dimming signal 1928 and outputs a signal 1933 (e.g., the signal 933, the signal 1033, or the signal 1133) to the logic control and gate drive component 1998. In another example, the logic control and gate drive component 1998 also receives the dimming signal 1928, a control signal 1920 (e.g., the signal 920, the signal 1020, or the signal 1120) and a signal 1924 (e.g., the signal 924, the signal 1024, or the signal 1124), and outputs the signal 378. In yet another example, a duty cycle of the dimming signal 1928 represents the conduction angle of the TRIAC dimmer 318. In yet another example, the duty cycle of the dimming signal 1928 can be determined as follows:

$$\text{duty cycle} = \frac{T_{on}}{T_{on} + T_{off}} \quad \text{(Equation 1)}$$

where $T_{on}$ represents a time period when the dimming signal 1928 to be at the logic high level, and $T_{off}$ represents a time period when the dimming signal 1928 to be at the logic low level. For example, $T_{on}$ corresponds to the duration of the on period of the TRIAC dimmer 318 and $T_{off}$ corresponds to the duration of the off period of the TRIAC dimmer 318.

According to certain embodiments, the detection component 1911 determines the duty cycle of the dimming signal 1928, and outputs the signal 1933 at the logic low level if the duty cycle of the dimming signal 1928 is larger than a threshold. For example, if the signal 1933 is at the logic low level and the dimming signal 1928 is at the logic high level, the logic control and gate drive component 1998 changes, in response to the signal 1920, the signal 378 in order to close (e.g., to turn on) or open (e.g., to turn off) the switch 352 corresponding to a modulation frequency, so long as the signal 1924 remains at the logic high level. In one embodiment, the modulation frequency is equal to 1 divided by a corresponding modulation period.

In another example, if the signal 1933 is at the logic low level and the dimming signal 1928 is also at the logic low level, the logic control and gate drive component 1998 affects the signal 378 in order to keep the switch 352 closed (e.g., on) for a first period of time so long as the signal 1924 remains at the logic high level. In one embodiment, the first period of time is equal to or larger than the modulation period. In another embodiment, the first period of time is larger than the modulation period. In yet another embodiment, the first period of time is equal to, in duration, the off period of the TRIAC dimmer 318.

According to some embodiments, the detection component 1911 determines the duty cycle of the dimming signal 1928, and outputs the signal 1933 at the logic high level if the duty cycle of the dimming signal 1928 is smaller than the threshold. For example, if the signal 1933 is at the logic high level, the logic control and gate drive component 1998 affects the signal 378 in order to keep the switch 352 open (e.g., off) for a second period of time until the system 300 is turned off. In one embodiment, the second period of time is equal to or larger than the modulation period. In another embodiment, the second period of time is larger than the modulation period.

Figure 11:
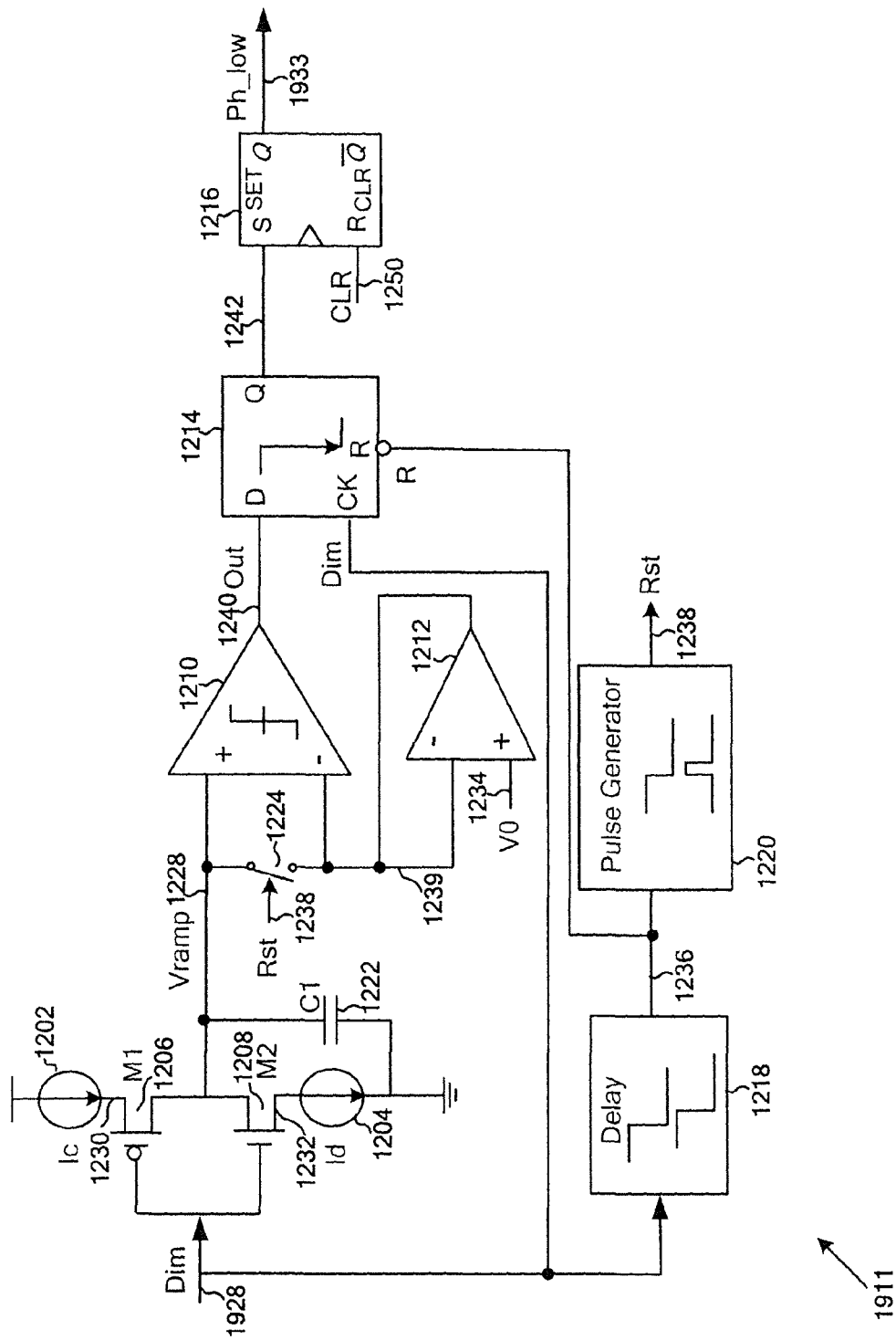
FIG. 11 is a simplified diagram showing certain components of the detection component as part of the system controller as shown in FIG. 10 according to an embodiment of the present invention.

FIG. 11 is a simplified diagram showing certain components of the detection component 1911 as part of the system controller 302 as shown in FIG. 10 according to an embodiment of the present invention. This diagram is merely an example, which should not unduly limit the scope of the claims. One of ordinary skill in the art would recognize many variations, alternatives, and modifications. The detection component 1911 includes current sources 1202 and 1204, transistors 1206 and 1208, a comparator 1210, an amplifier 1212, a D flip flop component 1214, a flip flop component 1216, a delay component 1218, a pulse generator 1220, a capacitor 1222, and a switch 1224. For example, the detection component 1911 is the same as the detection component 911, the detection component 1011, or the detection component 1111. In another example, the transistor 1206 is a P-channel field effect transistor. In yet another example, the transistor 1208 is an N-channel field effect transistor.

According to one embodiment, at the beginning of a dimming period associated with the TRIAC dimmer 318, the voltage on the capacitor 1222 is set to be approximately a predetermined threshold signal 1234 (e.g., $V_0$). For example, the signal 1234 is an initial voltage at the capacitor 1222 at the beginning of an off period of the TRIAC dimmer 318. In another example, during the off period of the TRIAC dimmer 318, the dimming signal 1928 is at a logic low level. In yet another example, in response the transistor 1206 is turned on to conduct the current 1230 (e.g., $I_c$) associated with the current source 1202 and the transistor 1208 is turned off. In yet another example, the capacitor 1222 is charged by the current 1230 (e.g., $I_c$). In yet another example, the voltage signal 1228 increases in magnitude (e.g., linearly or non-linearly). Thus, at the end of the off period of the TRIAC dimmer 318, a voltage signal 1228 generated at the capacitor 1222 is determined as follows, in some embodiments:

$$V_{ramp1} = V_0 + \frac{I_c \times T_{off}}{C_1} \quad \text{(Equation 2)}$$

where $V_{ramp1}$ represents the voltage signal 1228 at the end of the off period of the TRIAC dimmer 318, $V_0$ represents the predetermined threshold signal 1234, $I_c$ represents the current 1230, and $C_1$ represents the capacitance of the capacitor 1222.

For example, during the on period of the TRIAC dimmer 318, the dimming signal 1928 is at a logic high level. In another example, in response the transistor 1208 is turned on to conduct the current 1232 (e.g., $I_d$) associated with the current source 1204 and the transistor 1206 is turned off. In yet another example, the capacitor 1222 is discharged, and the voltage signal 1228 decreases in magnitude (e.g., linearly or non-linearly). Thus, at the end of the on period of the TRIAC dimmer 318, the voltage signal 1228 generated at the capacitor 1222 is determined as follows, in certain embodiments:

$$V_{ramp2} = V_{ramp1} - \frac{I_d \times T_{on}}{C_1} \quad \text{(Equation 3)}$$

where $V_{ramp2}$ represents the voltage signal 1228 at the end of the on period of the TRIAC dimmer 318 and $I_d$ represents the current 1232.

Combining Equation (1) and Equation (2), the voltage signal 1228 at the end of the on period of the TRIAC dimmer 318 is determined as follows:

$$V_{ramp2} = V_0 + \frac{I_c \times T_{off}}{C_1} - \frac{I_d \times T_{on}}{C_1} \quad \text{(Equation 4)}$$

According to another embodiment, the amplifier 1212 receives the threshold signal 1234 (e.g., $V_0$) at a non-inverting terminal, and an inverting terminal and an output terminal of the amplifier 1212 are connected. For example, the amplifier 1212 outputs a signal 1239 which is approximately equal to the threshold signal 1234 in magnitude. At the end of the on period of the TRIAC dimmer 318, the comparator 1210 compares the voltage signal 1228 and the signal 1239 in some embodiments. The following equation is derived from Equation (3), $$V_{ramp2} - V_0 = \frac{I_c \times T_{off}}{C_1} - \frac{I_d \times T_{on}}{C_1} \quad \text{(Equation 5)}$$

As shown in Equation (4), if $I_c$, $I_d$, $T_{on}$ and $T_{off}$ satisfy the following equation, $V_{ramp2} = V_0$.

$$\frac{T_{on}}{T_{off}} = \frac{I_c}{I_d} \qquad \text{(Equation 6)}$$

Equation (6) can be transformed mathematically into the following equation:

$$\frac{T_{on}}{T_{on} + T_{off}} = \frac{I_c}{I_c + I_d} \qquad \text{(Equation 7)}$$

Thus, a turn-off threshold for the duty cycle of the dimming signal 1928 can be determined if the ratio of $I_c$ and $I_d$ is predefined in some embodiments. For example, if at the end of the on period of the TRIAC dimmer 318, the voltage signal 1228 is smaller than the threshold signal 1234 in magnitude, the duty cycle of the dimming signal 1928 is larger than the turn-off threshold and the system controller 302 does not turn off the system 300. On the other hand, if at the end of the on period of the TRIAC dimmer 318, the voltage signal 1228 is larger than the threshold signal 1234 in magnitude, the duty cycle of the dimming signal 1928 is smaller than the turn-off threshold and the system controller 302 turns off the system 300.

According to another embodiment, the delay component 1218 receives the dimming signal 1928 and generates a signal 1236 which is received by the pulse generator 1220 and the D flip flop component 1214. For example, the pulse generator 1220 outputs a signal 1238 (e.g., signal Rst) and the switch 1224 is closed (e.g., turned on) or opened (e.g., turned off) in response to the signal 1238. In another example, the signal 1238 includes a pulse at the end of the dimming period, and the switch 1224 is closed (e.g., turned on) in response to the pulse to reset the voltage signal 1228 (e.g., $V_{ramp}$) to the threshold signal 1234 (e.g., $V_0$). In yet another example, the comparator 1210 generates an output signal 1240 to the D flip flop component 1214 which also receives the dimming signal 1928 and outputs a signal 1242. In yet another example, the flip flop component 1216 receives the signal 1242 and a signal 1250 and outputs the signal 1933. In yet another example, if the signal 1933 is at a logic low level, the system controller 302 operates normally, and if the signal 1933 is at a logic high level, the system controller 302 changes the signal 378 in order to keep the switch 352 open (e.g., off) until the system 300 is turned off.

Figure 12A:
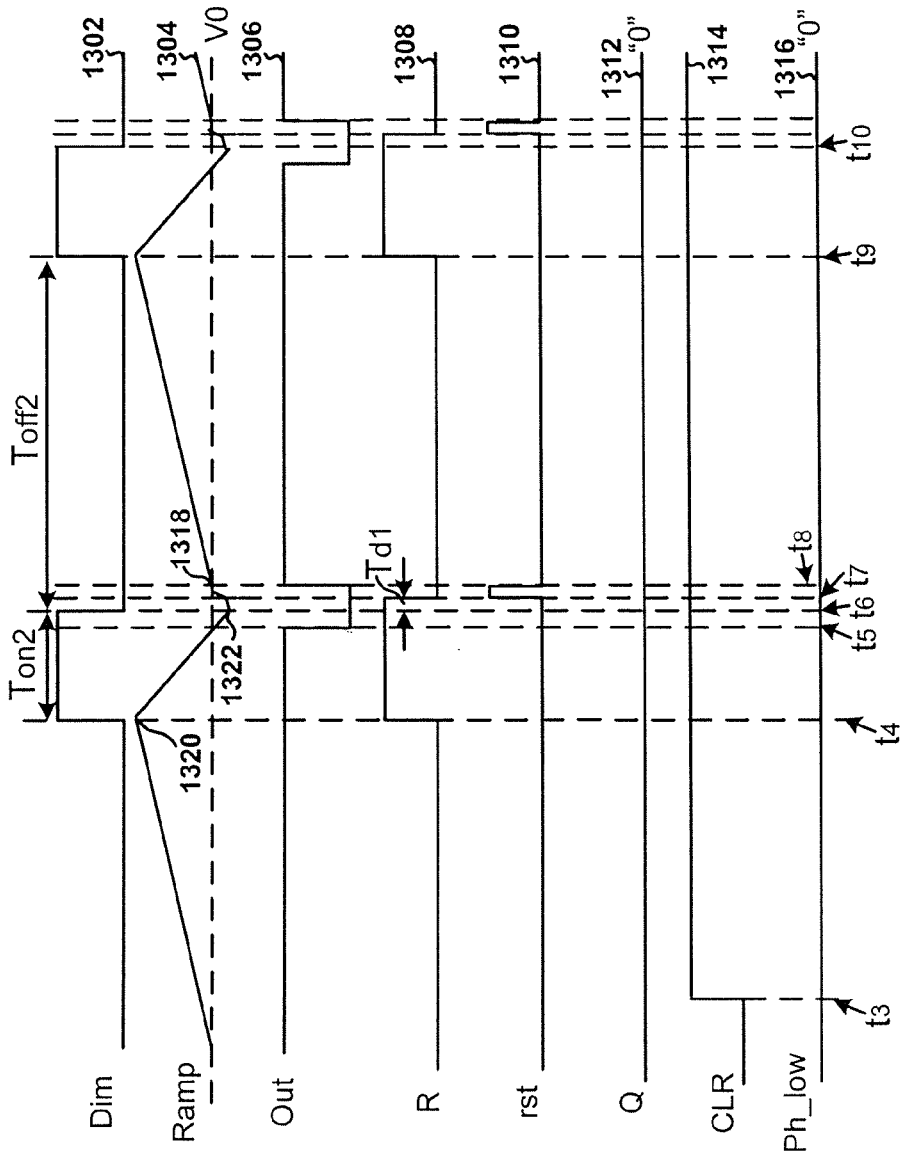
FIG. 12(a) shows simplified timing diagrams for the detection component as part of the system controller for the system as shown in FIG. 10 if the dimming signal has a large duty cycle.
Figure 12B:
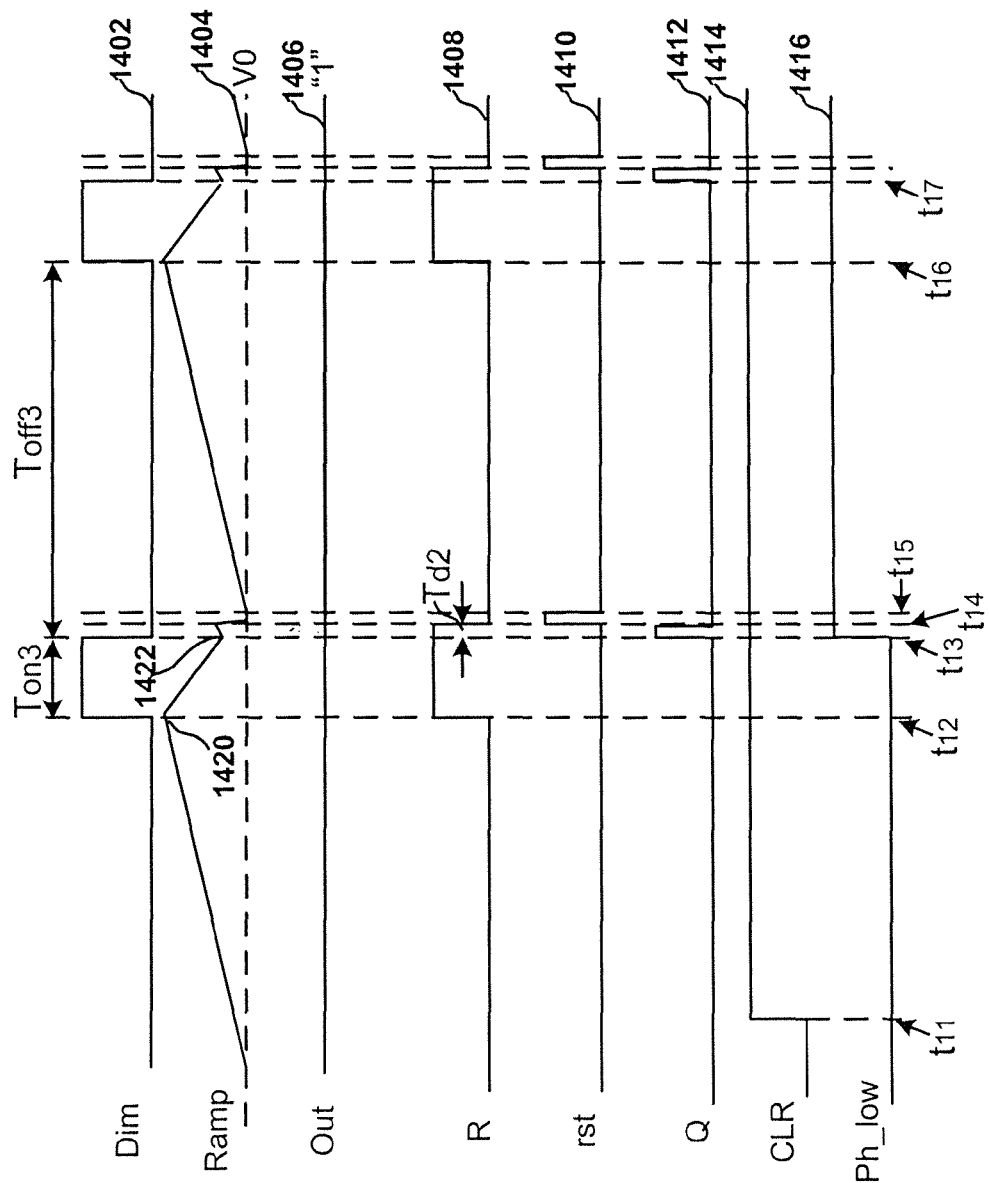
FIG. 12(b) shows simplified timing diagrams for the detection component as part of the system controller for the system as shown in FIG. 10 if the dimming signal has a small duty cycle according to some embodiments of the present invention.

FIG. 12(a) shows simplified timing diagrams for the detection component 1911 as part of the system controller 302 for the system 300 if the dimming signal 1928 has a large duty cycle, and FIG. 12(b) shows simplified timing diagrams for the detection component 1911 as part of the system controller 302 for the system 300 if the dimming signal 1928 has a small duty cycle according to some embodiments of the present invention. These diagrams are merely examples, which should not unduly limit the scope of the claims. One of ordinary skill in the art would recognize many variations, alternatives, and modifications.

As shown in FIG. 12(a), the waveform 1302 represents the dimming signal 1928 as a function of time, the waveform 1304 represents the voltage signal 1228 as a function of time, the waveform 1306 represents the output signal 1240 as a function of time, and the waveform 1308 represents the signal 1236 as a function of time. In addition, the waveform 1310 represents the signal 1238 as a function of time, the waveform 1312 represents the signal 1242 as a function of time, the waveform 1314 represents the signal 1250 as a function of time, and the waveform 1316 represents the signal 1933 as a function of time.

Three time periods are shown in FIG. 12(a), an on time period $T_{on2}$, an off time period $T_{off2}$, and a delay time period $T_{d1}$. The time period $T_{on2}$ starts at time $t_4$ and ends at time $t_6$, the time period $T_{off2}$ starts at the time $t_6$ and ends at time $t_9$, and the delay time period $T_{d1}$ starts at the time $t_6$ and ends at time $t_7$. For example, $t_3 \leq t_4 \leq t_5 \leq t_6 \leq t_7 \leq t_8 \leq t_9 \leq t_{10}$.

As shown in FIG. 12(a), when the duty cycle of the dimming signal 1928 is larger than a turn-off threshold, the detection component 1911 outputs the signal 1933 at a logic low level (e.g., 0 as shown by the waveform 1316) in some embodiments. For example, at $t_3$, the signal 1250 changes from a logic low level to a logic high level which indicates the start of the operating cycle. In another example, the dimming signal 1928 keeps at the logic low level during the time period between $t_3$ and $t_4$ (e.g., as shown by the waveform 1302). In yet another example, the transistor 1206 is turned on to conduct the current 1230 (e.g., $I_c$) and the transistor 1208 is turned off. In yet another example, in response the capacitor 1222 is charged in response to the current 1230 and the voltage signal 1228 increases in magnitude (e.g., to a magnitude 1320 at $t_4$ as shown by the waveform 1304).

According to one embodiment, at the beginning of the on time period (e.g., $t_4$), the dimming signal 1928 changes from the logic low level to a logic high level (e.g., as shown by the waveform 1302). For example, the delay component 1218 changes the signal 1236 from the logic low level to the logic high level (e.g., at $t_4$ as shown by the waveform 1308). In another example, the transistor 1208 is turned on to conduct the current 1232 (e.g., $I_d$) and the transistor 1206 is turned off. In yet another example, the capacitor 1222 begins to be discharged in response. In yet another example, during the on time period, the voltage signal 1228 decreases in magnitude (e.g., to a magnitude 1322 at $t_6$ as shown by the waveform 1304). In yet another example, when the voltage signal 1228 becomes smaller than the threshold signal 1234 (e.g., $V_0$), the comparator 1210 changes the output signal 1240 from the logic high level to the logic low level (e.g., at $t_5$ as shown by the waveform 1306). In yet another example, during the on time period, the signal 1933 remains at the logic low level (e.g., as shown by the waveform 1316) and the system 300 operates normally.

According to another embodiment, at the beginning of the off time period (e.g., $t_6$), the dimming signal 1928 changes from the logic high level to the logic low level (e.g., as shown by the waveform 1302). For example, after a delay (e.g., $T_{d1}$), the delay component 1218 changes the signal 1236 from the logic high level to the logic low level (e.g., at $t_7$ as shown by the waveform 1308), so that the D flip flop component 1214 which receives the signal 1236 as the reset signal is not immediately reset when the falling edge of the dimming signal 1928 arrives. In another example, upon the falling edge of the signal 1236 (e.g., at $t_7$), the pulse generator 1220 generates a pulse in the signal 1238 (e.g., as shown by the waveform 1310). In yet another example, in response to the pulse in the signal 1238, the switch 1224 is closed (e.g., turned on) and the voltage signal 1228 is changed to become approximately equal to the output signal 1239 of the amplifier 1212 in magnitude (e.g., the magnitude 1318 as shown by the waveform 1304).

According to yet another embodiment, during the off time period (e.g., between $t_8$ and $t_9$), the dimming signal 1928 keeps at the logic low level (e.g., as shown by the waveform 1302). In yet another example, the transistor 1206 is turned on to conduct the current 1230 (e.g., $I_c$) and the transistor 1208 is turned off. In yet another example, in response the capacitor 1222 is charged in response to the current 1230 and the voltage signal 1228 increases in magnitude (e.g., as shown by the waveform 1304). In yet another example, during the off time period, the signal 1933 remains at the logic low level (e.g., as shown by the waveform 1316) and the system 300 operates normally.

As shown in FIG. 12(*b*), the waveform 1402 represents the dimming signal 1928 as a function of time, the waveform 1404 represents the voltage signal 1228 as a function of time, the waveform 1406 represents the output signal 1240 as a function of time, and the waveform 1408 represents the signal 1236 as a function of time. In addition, the waveform 1410 represents the signal 1238 as a function of time, the waveform 1412 represents the signal 1242 as a function of time, the waveform 1414 represents the signal 1250 as a function of time, and the waveform 1416 represents the signal 1933 as a function of time.

Two time periods are shown in FIG. 12(*b*), an on time period $T_{on3}$ and an off time period $T_{off3}$. The time period $T_{on3}$ starts at time $t_{12}$ and ends at time $t_{13}$ and the time period $T_{off3}$ starts at the time $t_{13}$ and ends at time $t_{16}$. For example, $t_{11} \leq t_{12} \leq t_{13} \leq t_{14} \leq t_{15} \leq t_{16} \leq t_{17}$.

As shown in FIG. 12(*b*), when the duty cycle of the dimming signal 1928 is smaller than a turn-off threshold, the detection component 1911 changes the signal 1933 from a logic low level to a logic high level (e.g., as shown by the waveform 1416) in some embodiments. For example, at $t_{11}$, the signal 1250 changes from a logic low level to a logic high level which indicates the start of the operating cycle. In another example, the dimming signal 1928 keeps at the logic low level during the time period between $t_{11}$ and $t_{12}$ (e.g., as shown by the waveform 1402). In yet another example, the transistor 1206 is turned on to conduct the current 1230 (e.g., $I_c$) and the transistor 1208 is turned off. In yet another example, in response the capacitor 1222 is charged in response to the current 1230 and the voltage signal 1228 increases in magnitude (e.g., to a magnitude 1420 at $t_{12}$ as shown by the waveform 1404).

According to one embodiment, at the beginning of the on time period (e.g., $t_{12}$), the dimming signal 1928 changes from the logic low level to a logic high level (e.g., as shown by the waveform 1402). For example, the delay component 1218 changes the signal 1236 from the logic low level to the logic high level (e.g., at $t_{12}$ as shown by the waveform 1408). In another example, the transistor 1208 is turned on to conduct the current 1232 (e.g., $I_d$) and the transistor 1206 is turned off. In yet another example, the capacitor 1222 begins to be discharged in response. In yet another example, during the on time period, the voltage signal 1228 decreases in magnitude (e.g., to a magnitude 1422 at $t_{13}$), but keeps larger than the threshold signal 1234 in magnitude (e.g., as shown by the waveform 1404). In yet another example, the comparator 1210 keeps the output signal 1240 at the logic high level (e.g., as shown by the waveform 1406). In yet another example, during the on time period, the signal 1933 remains at the logic low level (e.g., as shown by the waveform 1416) and the system 300 operates normally.

According to another embodiment, at the beginning of the off time period (e.g., $t_{13}$), the dimming signal 1928 changes from the logic high level to the logic low level (e.g., as shown by the waveform 1402). For example, after a delay (e.g., $T_{d2}$), the delay component 1218 changes the signal 1236 from the logic high level to the logic low level (e.g., at $t_{14}$ as shown by the waveform 1408). In another example, upon the falling edge of the signal 1236 (e.g., at $t_{14}$), the pulse generator 1220 generates a pulse in the signal 1238 (e.g., as shown by the waveform 1410). In yet another example, the D flip flop component that receives the dimming signal 1928 generates a pulse in the signal 1242 in response to the falling edge of the dimming signal 1928 (e.g., as shown by the waveform 1412). In yet another example, the flip flop component 1216 changes the signal 1933 from the logic low level to the logic high level in response to the pulse in the signal 1242 (e.g., as shown by the waveform 1416). In yet another example, the system controller 302 changes the signal 378 in order to keep the switch 352 open (e.g., off) until the system 300 is turned off.

As shown in FIG. 12(*a*) and FIG. 12(*b*), at the end of the off period of the TRIAC dimmer 318 (e.g., at $t_9$ as shown in FIG. 12(*a*) or at $t_{16}$ as shown in FIG. 12(*b*)), the voltage signal 1228 generated at the capacitor 1222 can be determined as follows, in some embodiments:

$$V_{ramp1} = V_0 + \frac{I_c \times (T_{off} - T_d - T_{pulse})}{C_1} \quad \text{(Equation 8)}$$

where $V_{ramp1}$ represents the voltage signal 1228 at the end of the off period of the TRIAC dimmer 318, $V_0$ represents the predetermined threshold signal 1234, $I_c$ represents the current 1230, and $C_1$ represents the capacitance of the capacitor 1222. In addition, $T_{off}$ represents the duration of the off period of the TRIAC dimmer 318, $T_d$ represents the delay between a falling edge of the dimming signal 1928 and a falling edge of the signal 1236 during a same dimming period of the TRIAC dimmer 318 (e.g., $T_{d1}$ in FIG. 12(*a*) and $T_{d2}$ in FIG. 12(*b*)), and $T_{pulse}$ represents a pulse width in the signal 1238.

For example, $T_{off} \gg T_d + T_{pulse}$, and thus $$V_{ramp1} \approx V_0 + \frac{I_c \times T_{off}}{C_1} \quad \text{(Equation 9)}$$

At the end of the on period of the TRIAC dimmer 318 (e.g., at $t_{10}$ as shown in FIG. 12(*a*) or at $t_{17}$ as shown in FIG. 12(*b*)), the voltage signal 1228 generated at the capacitor 1222 is determined as follows, in certain embodiments:

$$V_{ramp2} \approx V_{ramp1} - \frac{I_d \times T_{on}}{C_1} \quad \text{(Equation 10)}$$

where $V_{ramp2}$ represents the voltage signal 1228 at the end of the on period of the TRIAC dimmer 318 and $I_d$ represents the current 1232.

Combining Equation (9) and Equation (10) yields the following equation:

$$V_{ramp2} \approx V_0 + \frac{I_c \times T_{off}}{C_1} - \frac{I_d \times T_{on}}{C_1} \quad \text{(Equation 11)}$$

Thus, $$V_{ramp2} - V_0 \approx \frac{I_c \times T_{off}}{C_1} - \frac{I_d \times T_{on}}{C_1} \quad \text{(Equation 12)}$$

As shown in Equation (12), if $I_c$, $I_d$, $T_{on}$ and $T_{off}$ satisfy Equation 6, $V_{ramp2} \approx V_0$. Thus, a turn-off threshold for the duty cycle of the dimming signal 1928 can be approximately determined according to Equation 7 if the ratio of $I_c$ and $I_d$ is predefined, in some embodiments.

According to another embodiment, a system for dimming control of one or more light emitting diodes includes one or more signal processing components configured to receive a first signal associated with a TRIAC dimmer, process information associated with the first signal, determine whether the TRIAC dimmer is in a first condition or a second condition, generate a second signal based on at least information associated with the first signal, and send the second signal to a switch. The one or more signal processing components are further configured to, if the TRIAC dimmer is determined to be in the first condition, generate the second signal to cause the switch to be opened and closed corresponding to a modulation frequency, and if the TRIAC dimmer is determined to be in the second condition, generate the second signal to cause the switch to remain closed for a first period of time until at least the TRIAC dimmer changes from the second condition to the first condition. For example, the system is implemented according to FIG. 3, FIG. 4, FIG. 5, FIG. 6, FIG. 7, FIG. 9(a), FIG. 9(b), FIG. 9(c), FIG. 10, FIG. 11, FIG. 12(a) and/or FIG. 12(b).

For example, the one or more signal processing components are further configured to determine whether the TRIAC dimmer is in a third condition; and if the TRIAC dimmer is determined to be in the third condition, generate the second signal to cause the switch to remain open for a second period of time. In another example, the first period of time is larger than a modulation period corresponding to the modulation frequency. In yet another example, the second period of time is larger than a modulation period corresponding to the modulation frequency. In yet another example, the one or more signal processing components are further configured to generate a third signal based on at least information associated with the first signal, process information associated with the third signal, and generate the second signal based on at least information associated with the third signal. In yet another example, the one or more signal processing components are further configured to, if a duty cycle of the second signal is larger than a threshold value and if the first signal is larger than a threshold signal in magnitude, determine the TRIAC dimmer to be in the first condition. In yet another example, the one or more signal processing components are further configured to, if a duty cycle of the second signal is larger than the threshold value and if the first signal is smaller than the threshold signal in magnitude, determine the TRIAC dimmer to be in the second condition. In yet another example, wherein the one or more signal processing components are further configured to, if a duty cycle of the second signal is smaller than the threshold value, determine the TRIAC dimmer to be in the third condition. In yet another example, the one or more signal processing components are further configured to process information associated with the first signal and a threshold signal, determine the TRIAC dimmer to be in the first condition if the first signal is larger than the threshold signal in magnitude, and determine the TRIAC dimmer to be in the second condition if the first signal is smaller than the threshold signal in magnitude.

For example, the first condition corresponds to an on condition for the TRIAC dimmer, and the second condition corresponds to an off condition for the TRIAC dimmer. In another example, the one or more signal processing components includes, a first comparator configured to receive a first threshold signal and the first signal and generate a comparison signal based on at least information associated with the first threshold signal and the first signal, and a driving component configured to receive the comparison signal, generate the second signal based on at least information associated with the comparison signal, and output the second signal to the switch. In yet another example, the one or more signal processing components further includes, a modulation component configured to receive a current sensing signal associated with a primary current flowing through a primary winding of a transformer and a third signal associated with the first signal and output a modulation signal to the driving component based on at least information associated with the current sensing signal and the third signal, the transformer further including a secondary winding and an auxiliary winding. The modulation component is further configured to, if the current sensing signal is larger than the third signal in magnitude, generate the modulation signal at a first logic level to cause the switch to be opened, and if the current sensing signal is smaller than the third signal in magnitude, generate the modulation signal at a second logic level to cause the switch to be closed. In yet another example, the one or more signal processing components further includes, a multiplexer configured to receive the first signal and a fourth signal and generate a fifth signal based on at least information associated with the first signal and the fourth signal, and an offset component configured to receive the fifth signal and output the third signal by adding a predetermined offset to the fifth signal to keep the third signal no smaller than the current sensing signal in magnitude when the TRIAC dimmer is in the second condition.

As an example, the one or more signal processing components further includes, a second comparator configured to receive the current sensing signal and a second threshold signal and output a fourth signal to the driving component based on at least information associated with the current sensing signal and the second threshold signal. The second comparator is further configured to, if the current sensing signal is smaller than the second threshold signal in magnitude, generate the fourth signal at a third logic level to cause the switch to be closed. In another example, the one or more signal processing components further includes a multiplexer configured to receive the first signal and a fourth signal and output the third signal to the modulation component based on at least information associated with the first signal and the fourth signal. In yet another example, the one or more signal processing components further includes a current regulation component configured to receive the current sensing signal and output a processed signal to the multiplexer based on at least information associated with the current sensing signal. In yet another example, the one or more signal processing components further includes a second comparator configured to receive a fourth signal associated with the auxiliary winding and a second threshold signal and output a fifth signal to the driving component based on at least information associated with the fourth signal and the second threshold signal, the fifth signal indicating whether a demagnetization process associated with the transformer has completed.

According to another embodiment, a system for dimming control of one or more light emitting diodes includes a first comparator and a driving component. The first comparator is configured to receive a first threshold signal and an input signal associated with a TRIAC dimmer and generate a comparison signal based on at least information associated with the first threshold signal and the input signal. The driving component is configured to receive the comparison signal, generate an output signal based on at least information associated with the comparison signal, and send the output signal to a switch. The first comparator is further configured to generate the comparison signal at a first logic level if the input signal is larger than the first threshold signal in magnitude and generate the comparison signal at a second logic level if the input signal is smaller than the first threshold signal in magnitude. The driving component is further configured to generate the output signal and cause the switch to remain closed for a period of time until at least the comparison signal changes from the second logic level to the first logic level. For example, the system is implemented according to at least FIG. 3, FIG. 4, FIG. 5, FIG. 6, FIG. 7, FIG. 9(a), FIG. 9(b), FIG. 9(c), FIG. 10, FIG. 12(a) and/or FIG. 12(b).

For example, the driving component is further configured to, if the comparison signal is at the first logic level, generate the output signal to cause the switch to be opened and closed corresponding to a modulation frequency. In another example, the period of time is larger than a modulation period corresponding to the modulation frequency. In yet another example, the system further includes a modulation component configured to receive a current sensing signal associated with a primary current flowing through a primary winding of a transformer and a third signal associated with the input signal and output a modulation signal to the driving component based on at least information associated with the current sensing signal and the third signal, the transformer further including a secondary winding and an auxiliary winding. The modulation component is further configured to, if the current sensing signal is larger than the third signal in magnitude, generate the modulation signal at a third logic level to cause the switch to be opened, and if the current sensing signal is smaller than the third signal in magnitude, generate the modulation signal at a fourth logic level to cause the switch to be closed. In yet another example, the system further includes, a multiplexer configured to receive the input signal and a fourth signal and generate a fifth signal based on at least information associated with the input signal and the fourth signal, and an offset component configured to receive the fifth signal and output the third signal by adding a predetermined offset to the fifth signal to cause the third signal to be larger than the current sensing signal in magnitude when the input signal is smaller than the first threshold signal in magnitude.

As an example, the system further includes a second comparator configured to receive the current sensing signal and a second threshold signal and output a fourth signal to the driving component based on at least information associated with the current sensing signal and the second threshold signal. The second comparator is further configured to, if the current sensing signal is smaller than the second threshold signal in magnitude, generate the fourth signal at a fifth logic level to cause the switch to be closed. In another example, the system further includes a multiplexer configured to receive the input signal and a fourth signal and output the third signal to the modulation component based on at least information associated with the input signal and the fourth signal. In yet another example, the system further includes a current regulation component configured to receive the current sensing signal and output a processed signal to the multiplexer based on at least information associated with the current sensing signal. In yet another example, the system further includes a second comparator configured to receive a fourth signal associated with the auxiliary winding and a second threshold signal and output a fifth signal to the driving component based on at least information associated with the fourth signal and the second threshold signal, the fifth signal indicating whether a demagnetization process associated with the transformer has completed.

According to yet another embodiment, a system for dimming control of one or more light emitting diodes includes a first comparator, a detection component, and a driving component. The first comparator is configured to receive a first threshold signal and a first signal associated with a TRIAC dimmer and generate a first comparison signal based on at least information associated with the first threshold signal and the first signal. The detection component is configured to receive the first comparison signal, determine a duty cycle of the first comparison signal, process information associated with the duty cycle and a threshold value, and generate a detection signal based on at least information associated with the first comparison signal. The driving component is configured to receive the detection signal, generate a second signal based on at least information associated with the detection signal, and output the second signal to a switch. The first comparator is further configured to generate the first comparison signal at a first logic level if the first signal is larger than the threshold signal in magnitude and generate the first comparison signal at a second logic level if the first signal is smaller than the threshold signal in magnitude. The detection component is further configured to generate the detection signal at a third logic level if the duty cycle of the first comparison signal is larger than the threshold value in magnitude and generate the detection signal at a fourth logic level if the duty cycle of the first comparison signal is smaller than the threshold value in magnitude. The driving component is further configured to, if the detection signal is at the fourth logic level, generate the second signal to cause the switch to remain open for a first period of time. For example, the system is implemented according to at least FIG. 3, FIG. 9(a), FIG. 9(b), FIG. 9(c), FIG. 10, FIG. 11, FIG. 12(a) and/or FIG. 12(b).

For example, the first comparator is further configured to output the comparison signal to the driving component, and the driving component is further configured to generate the second signal to cause the switch to remain closed for a second period of time until at least the comparison signal changes from the first logic level to the second logic level. In another example, the driving component is further configured to, if the comparison signal is at the first logic level and the detection signal is at the third logic level, generate the second signal to cause the switch to be opened and closed corresponding to a modulation frequency. In yet another example, the first period of time is larger than a modulation period corresponding to the modulation frequency. In yet another example, the second period of time is larger than a modulation period corresponding to the modulation frequency. In yet another example, the detection component includes, a voltage generator configured to receive the first comparison signal and generate a third signal based on at least information associated with the first comparison signal, a second comparator configured to receive the third signal and a threshold signal and generate a second comparison signal based on at least information associated with the third signal and the threshold signal, and a signal processor configured to receive the first comparison signal and the second comparison signal and generate an output signal based on at least information associated with the first comparison signal and the second comparison signal.

According to yet another embodiment, a system for detecting a duty cycle of a signal includes a voltage generator, a comparator, and a signal generator. The voltage generator is configured to receive an input signal and generate a first voltage signal based on at least information associated with the input signal. The comparator is configured to receive the first voltage signal and a threshold signal and generate a comparison signal based on at least information associated with the first voltage signal and the threshold signal. The signal processor is configured to receive the comparison signal and the input signal and generate an output signal based on at least information associated with the comparison signal and the input signal. The comparator is further configured to, if the first voltage signal is larger than the threshold signal in magnitude, generate the comparison signal at a first logic level, and if the first voltage signal is smaller than the threshold signal in magnitude, generate the comparison signal at a second logic level. The signal processor is further configured to, if a duty cycle of the input signal is larger than a threshold value, generate the output signal at a third logic level, and if the duty cycle of the input signal is smaller than the threshold value, generate the output signal at a fourth logic level. The signal processor is further configured to, if the input signal changes from a fifth logic level to a sixth logic level and if the comparison signal is at the first logic level, change the output signal from the third logic level to the fourth logic level. For example, the system is implemented according to at least FIG. 3, FIG. 9(a), FIG. 9(b), FIG. 9(c), FIG. 10, FIG. 11, FIG. 12(a) and/or FIG. 12(b).

For example, the voltage generator includes, a first current source configured to provide a first current, a second current source configured to provide a second current, a first transistor configured to conduct the first current if the input signal is at the sixth logic level, a second transistor configured to conduct the second current if the input signal is at the fifth logic level; and a capacitor configured to, if the input signal is at the sixth logic level, be charged by the first current flowing through the first transistor, and if the input signal is at the fifth logic level, be discharged by the second current flowing through the second transistor. In another example, the system further includes a switch coupled between a first input terminal of the comparator and a second input terminal of the comparator, the comparator further configured to receive the first voltage signal at the first input terminal and receive the threshold signal at the second input terminal. The switch is configured, if the input signal changes from the fifth logic level to the sixth logic level, to be closed after a predetermined delay. In yet another example, the system further includes a signal generator configured to receive the input signal, generate a first signal based on at least information associated with the input signal, and send the first signal to the switch. The signal generator is further configured to, if the input signal changes from the fifth logic level to the sixth logic level, change the first signal from a seventh logic level to an eighth logic level after the determined delay. In yet another example, the signal generator is further configured to, if the input signal changes from the fifth logic level to the sixth logic level, after the first signal is changed from the seventh logic level to the eighth logic level, change the first signal back to the seventh logic level from the eighth logic level to form a signal pulse. In yet another example, the switch is further configured to, if the first signal is at the seventh logic level, be opened, and if the first signal is at the eighth logic level, be closed.

In one embodiment, a method for dimming control of one or more light emitting diodes includes, receiving a first signal associated with a TRIAC dimmer, processing information associated with the first signal, and determining whether the TRIAC dimmer is in a first condition or a second condition based on at least information associated with the first signal. The method further includes generating a second signal based on at least information associated with the first signal, and outputting the second signal to a switch. The process for generating a second signal based on at least information associated with the first signal includes, if the TRIAC dimmer is determined to be in the first condition, generating the second signal to cause the switch to be opened and closed corresponding to a modulation frequency, and if the TRIAC dimmer is determined to be in the second condition, generating the second signal to cause the switch to remain closed for a first period of time until at least the TRIAC dimmer changes from the second condition to the first condition. For example, the method is implemented according to FIG. 3, FIG. 4, FIG. 5, FIG. 6, FIG. 7, FIG. 9(a), FIG. 9(b), FIG. 9(c), FIG. 10, FIG. 11, FIG. 12(a) and/or FIG. 12(b).

For example, the method further includes determining whether the TRIAC dimmer is in a third condition. The process for generating a second signal based on at least information associated with the first signal further includes, if the TRIAC dimmer is determined to be in the third condition, generating the second signal to cause the switch to remain open for a second period of time. In another example, the first period of time is larger than a modulation period corresponding to the modulation frequency. In yet another example, the second period of time is larger than a modulation period corresponding to the modulation frequency. In yet another example, the method further includes generating a third signal based on at least information associated with the first signal, processing information associated with the third signal, and generating the second signal based on at least information associated with the third signal. In yet another example, the process for determining whether the TRIAC dimmer is in a first condition or a second condition includes, if a duty cycle of the second signal is larger than a threshold value and if the first signal is larger than a threshold signal in magnitude, determining the TRIAC dimmer to be in the first condition. In yet another example, the process for determining whether the TRIAC dimmer is in a first condition or a second condition includes, if a duty cycle of the second signal is larger than the threshold value and if the first signal is smaller than the threshold signal in magnitude, determining the TRIAC dimmer to be in the second condition. In yet another example, the process for determining whether the TRIAC dimmer is in a third condition includes, if a duty cycle of the second signal is smaller than the threshold value, determining the TRIAC dimmer to be in the third condition. In yet another example, the method further includes receiving a threshold signal, and processing information associated with the threshold signal. The process for determining whether the TRIAC dimmer is in a first condition or a second condition includes, if the first signal is larger than the threshold signal in magnitude, determining the TRIAC dimmer to be in the first condition, and if the first signal is smaller than the threshold signal in magnitude, determining the TRIAC dimmer to be in the second condition.

In another embodiment, a method for dimming control of one or more light emitting diodes includes, receiving a threshold signal and an input signal associated with a TRIAC dimmer, generating a comparison signal based on at least information associated with the first threshold signal and the input signal, and receiving the comparison signal. The method further includes generating an output signal based on at least information associated with the comparison signal and sending the output signal to a switch. The process for generating a comparison signal based on at least information associated with the first threshold signal and the input signal includes, if the input signal is larger than the first threshold signal in magnitude, generating the comparison signal at a first logic level, and if the input signal is smaller than the first threshold signal in magnitude, generating the comparison signal at a second logic level. The process for sending the output signal to a switch includes sending the output signal to cause the switch to remain closed for a period of time until at least the comparison signal changes from the second logic level to the first logic level. For example, the method is implemented according to at least FIG. 3, FIG. 4, FIG. 5, FIG. 6, FIG. 7, FIG. 9(a), FIG. 9(b), FIG. 9(c), FIG. 10, FIG. 12(a) and/or FIG. 12(b).

For example, the process for sending the output signal to a switch includes, if the comparison signal is at the first logic level, sending the output signal to cause the switch to be opened and closed corresponding to a modulation frequency. In another example, the period of time is larger than a modulation period corresponding to the modulation frequency.

In yet another embodiment, a method for dimming control of one or more light emitting diodes includes receiving a threshold signal and an input signal associated with a TRIAC dimmer, generating a comparison signal based on at least information associated with the threshold signal and the input signal, and receiving the comparison signal. The method further includes determining a duty cycle of the comparison signal, processing information associated with the duty cycle and a threshold value, and generating a detection signal based on at least information associated with the comparison signal. In addition, the method includes receiving the detection signal, generating an output signal based on at least information associated with the detection signal, and sending the output signal to a switch. The process for generating a comparison signal based on at least information associated with the threshold signal and the input signal includes, if the input signal is larger than the threshold signal in magnitude, generating the comparison signal at a first logic level, and if the input signal is smaller than the threshold signal in magnitude, generating the comparison signal at a second logic level. The process for generating a detection signal based on at least information associated with the comparison signal includes, if the duty cycle of the comparison signal is larger than the threshold value in magnitude, generating the detection signal at a third logic level, and if the duty cycle of the comparison signal is smaller than the threshold value in magnitude, generating the detection signal at a fourth logic level. The process for generating an output signal based on at least information associated with the detection signal includes if the detection signal is at the fourth logic level, generating the output signal to cause the switch to remain open for a first period of time. For example, the method is implemented according to at least FIG. 3, FIG. 9(a), FIG. 9(b), FIG. 9(c), FIG. 10, FIG. 11, FIG. 12(a) and/or FIG. 12(b).

For example, the process for generating an output signal based on at least information associated with the detection signal further includes, generating the output signal to cause the switch to remain closed for a second period of time until at least the comparison signal changes from the first logic level to the second logic level. In another example, the process for generating an output signal based on at least information associated with the detection signal further includes, if the comparison signal is at the first logic level and the detection signal is at the third logic level, generating the output signal to cause the switch to be opened and closed corresponding to a modulation frequency. In yet another example, the first period of time is larger than a modulation period corresponding to the modulation frequency. In yet another example, the second period of time is larger than a modulation period corresponding to the modulation frequency.

In yet another embodiment, a method for detecting a duty cycle of a signal includes receiving an input signal, generating a first voltage signal based on at least information associated with the input signal, and receiving the first voltage signal and a threshold signal. The method further includes generating a comparison signal based on at least information associated with the first voltage signal and the threshold signal, receiving the comparison signal and the input signal, and generating an output signal based on at least information associated with the comparison signal and the input signal. The process for generating a comparison signal based on at least information associated with the first voltage signal and the threshold signal includes, if the first voltage signal is larger than the threshold signal in magnitude, generating the comparison signal at a first logic level, and if the first voltage signal is smaller than the threshold signal in magnitude, generating the comparison signal at a second logic level. The process for generating an output signal based on at least information associated with the comparison signal and the input signal includes, if a duty cycle of the input signal is larger than a threshold value, generating the output signal at a third logic level, if the duty cycle of the input signal is smaller than the threshold value, generating the output signal at a fourth logic level, and if the input signal changes from a fifth logic level to a sixth logic level and if the comparison signal is at the first logic level, changing the output signal from the third logic level to the fourth logic level. For example, the method is implemented according to at least FIG. 3, FIG. 9(a), FIG. 9(b), FIG. 9(c), FIG. 10, FIG. 11, FIG. 12(a) and/or FIG. 12(b).

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for dimming control of one or more light emitting diodes, the system comprising:
   one or more signal processing components configured to receive a first signal associated with a TRIAC dimmer, process information associated with the first signal, determine whether the TRIAC dimmer is in a first condition, a second condition, or a third condition based on at least information associated with the first signal, generate a second signal based on at least information associated with the first signal, and send the second signal to a switch;
   wherein the one or more signal processing components are further configured to:
      if the TRIAC dimmer is determined to be in the first condition, generate the second signal to cause the switch to be opened and closed corresponding to a modulation frequency;
      if the TRIAC dimmer is determined to be in the second condition, generate the second signal to cause the switch to remain closed for a first period of time until at least the TRIAC dimmer changes from the second condition to the first condition, the first period of time being larger than a modulation period corresponding to the modulation frequency; and if the TRIAC dimmer is determined to be in the third condition, generate the second signal to cause the switch to remain open for a second period of time, the second period of time being larger than the modulation period.

2. The system of claim 1 wherein the one or more signal processing components are further configured to generate a third signal based on at least information associated with the first signal, process information associated with the third signal, and generate the second signal based on at least information associated with the third signal.

3. The system of claim 2 wherein the one or more signal processing components are further configured to, if a duty cycle of the third signal is larger than a threshold value and if the first signal is larger than a threshold signal in magnitude, determine the TRIAC dimmer to be in the first condition.

4. The system of claim 3 wherein the one or more signal processing components are further configured to, if a duty cycle of the third signal is larger than the threshold value and if the first signal is smaller than the threshold signal in magnitude, determine the TRIAC dimmer to be in the second condition.

5. The system of claim 3 wherein the one or more signal processing components are further configured to, if a duty cycle of the third signal is smaller than the threshold value, determine the TRIAC dimmer to be in the third condition.

6. The system of claim 1 wherein the one or more signal processing components include:
a first comparator configured to receive a first threshold signal and the first signal and generate a comparison signal based on at least information associated with the first threshold signal and the first signal; and
a driving component configured to receive the comparison signal, generate the second signal based on at least information associated with the comparison signal, and output the second signal to the switch.

7. The system of claim 6 wherein the one or more signal processing components further include:
a modulation component configured to receive a current sensing signal associated with a primary current flowing through a primary winding of a transformer and a third signal associated with the first signal and output a modulation signal to the driving component based on at least information associated with the current sensing signal and the third signal, the transformer further including a secondary winding and an auxiliary winding;
wherein the modulation component is further configured to:
if the current sensing signal is larger than the third signal in magnitude, generate the modulation signal at a first logic level to cause the switch to be opened; and
if the current sensing signal is smaller than the third signal in magnitude, generate the modulation signal at a second logic level to cause the switch to be closed.

8. The system of claim 7 wherein the one or more signal processing components further include:
a multiplexer configured to receive the first signal and a fourth signal and generate a fifth signal based on at least information associated with the first signal and the fourth signal; and
an offset component configured to receive the fifth signal and output the third signal by adding a predetermined offset to the fifth signal to keep the third signal no smaller than the current sensing signal in magnitude when the TRIAC dimmer is in the second condition.

9. The system of claim 7 wherein the one or more signal processing components further include:
a second comparator configured to receive the current sensing signal and a second threshold signal and output a fourth signal to the driving component based on at least information associated with the current sensing signal and the second threshold signal;
wherein the second comparator is further configured to, if the current sensing signal is smaller than the second threshold signal in magnitude, generate the fourth signal at a third logic level to cause the switch to be closed.

10. The system of claim 7 wherein the one or more signal processing components further include a multiplexer configured to receive the first signal and a fourth signal and output the third signal to the modulation component based on at least information associated with the first signal and the fourth signal.

11. The system of claim 10 wherein the one or more signal processing components further include a current regulation component configured to receive the current sensing signal and output a processed signal to the multiplexer based on at least information associated with the current sensing signal.

12. The system of claim 7 wherein the one or more signal processing components further include a second comparator configured to receive a fourth signal associated with the auxiliary winding and a second threshold signal and output a fifth signal to the driving component based on at least information associated with the fourth signal and the second threshold signal, the fifth signal indicating whether a demagnetization process associated with the transformer has completed.

13. A method for dimming control of one or more light emitting diodes, the method comprising:
receiving a first signal associated with a TRIAC dimmer;
processing information associated with the first signal;
determining whether the TRIAC dimmer is in a first condition, a second condition, or a third condition based on at least information associated with the first signal;
generating a second signal based on at least information associated with the first signal; and
outputting the second signal to a switch;
wherein the process for generating a second signal based on at least information associated with the first signal includes:
if the TRIAC dimmer is determined to be in the first condition, generating the second signal to cause the switch to be opened and closed corresponding to a modulation frequency;
if the TRIAC dimmer is determined to be in the second condition, generating the second signal to cause the switch to remain closed for a first period of time until at least the TRIAC dimmer changes from the second condition to the first condition, the first period of time being larger than a modulation period corresponding to the modulation frequency; and
if the TRIAC dimmer is determined to be in the third condition, generating the second signal to cause the switch to remain open for a second period of time, the second period of time being larger than the modulation period.

14. The method of claim 13, and further comprising:
generating a third signal based on at least information associated with the first signal;
processing information associated with the third signal; and
generating the second signal based on at least information associated with the third signal.

15. The method of claim 14 wherein the process for determining whether the TRIAC dimmer is in a first condition, a second condition, or a third condition includes, if a duty cycle of the third signal is larger than a threshold value and if the first signal is larger than a threshold signal in magnitude, determining the TRIAC dimmer to be in the first condition.

16. The method of claim 15 wherein the process for determining whether the TRIAC dimmer is in a first condition, a second condition, or a third condition includes, if a duty cycle of the third signal is larger than the threshold value and if the first signal is smaller than the threshold signal in magnitude, determining the TRIAC dimmer to be in the second condition.

17. The method of claim 16 wherein the process for determining whether the TRIAC dimmer is in a first condition, a second condition, or a third condition includes, if a duty cycle of the third signal is smaller than the threshold value, determining the TRIAC dimmer to be in the third condition.

\* \* \* \* \*